(12) United States Patent
Prasad et al.

(10) Patent No.: US 12,445,937 B2
(45) Date of Patent: Oct. 14, 2025

(54) METHOD FOR TERMINAL TO CONTROL CONNECTION TO BASE STATION ON BASIS OF LOAD OF BASE STATION IN WIRELESS COMMUNICATION SYSTEM

(71) Applicant: Samsung Electronics Co., Ltd., Suwon-si (KR)

(72) Inventors: Basant Prasad, Suwon-si (KR); Sunghan Lee, Suwon-si (KR); Satya Kumar Vankayala, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 17/800,698

(22) PCT Filed: Feb. 19, 2021

(86) PCT No.: PCT/KR2021/002119
§ 371 (c)(1),
(2) Date: Aug. 18, 2022

(87) PCT Pub. No.: WO2021/167395
PCT Pub. Date: Aug. 26, 2021

(65) Prior Publication Data
US 2023/0073247 A1    Mar. 9, 2023

(30) Foreign Application Priority Data
Feb. 19, 2020    (KR) .......................... 10-2020-0020671

(51) Int. Cl.
*H04W 48/06*    (2009.01)
*H04W 72/12*    (2023.01)
(Continued)

(52) U.S. Cl.
CPC ....... *H04W 48/06* (2013.01); *H04W 72/1273* (2013.01); *H04W 72/23* (2023.01); *H04W 72/52* (2023.01)

(58) Field of Classification Search
CPC ..... H04W 24/10; H04W 36/08; H04W 36/30; H04W 36/00837
See application file for complete search history.

(56) References Cited

U.S. PATENT DOCUMENTS

| 8,660,600 B2 | 2/2014 | Khandekar et al. |
| 10,356,702 B2 | 7/2019 | Ingale et al. |

(Continued)

FOREIGN PATENT DOCUMENTS

| EP | 2355602 B1 | 8/2018 |
| KR | 10-2011-0110801 A | 10/2011 |

(Continued)

OTHER PUBLICATIONS

Takayuki Suziki et al., "LTE cell load estimation by radio quality measurement of UE based on BS configuration".
(Continued)

*Primary Examiner* — Romani Ohri
(74) *Attorney, Agent, or Firm* — Jefferson IP Law, LLP

(57) ABSTRACT

Provided is a method, performed by a terminal, of controlling access to a base station in a wireless communication system. The method may include receiving a master information block (MIB) from a base station through a physical broadcast channel (PBCH), identifying whether first load information about a load of the base station is included in the MIB, determining whether to access the base station by using the first load information based on a result of the identifying, and accessing the base station based on a result of the determining.

15 Claims, 18 Drawing Sheets

(51) Int. Cl.
*H04W 72/1273* (2023.01)
*H04W 72/23* (2023.01)
*H04W 72/52* (2023.01)

(56) References Cited

U.S. PATENT DOCUMENTS

| | | |
|---|---|---|
| 10,869,209 B2 | 12/2020 | Hahn et al. |
| 2012/0134268 A1* | 5/2012 | Lopez ................... H04W 76/12 370/232 |
| 2013/0072212 A1* | 3/2013 | Nakamura ............ H04W 16/08 455/452.1 |
| 2013/0230014 A1* | 9/2013 | Kitaji ............ H04W 36/008375 370/329 |
| 2014/0056282 A1* | 2/2014 | Sun ..................... H04W 52/247 370/330 |
| 2015/0094114 A1* | 4/2015 | Rao ..................... H04W 52/143 455/522 |
| 2015/0373638 A1 | 12/2015 | Zhang et al. |
| 2016/0105894 A1* | 4/2016 | Lu ......................... H04W 72/30 370/329 |
| 2016/0192257 A1* | 6/2016 | Zhu ....................... H04W 36/22 370/332 |
| 2018/0115927 A1* | 4/2018 | Vesterinen ........ H04W 36/0072 |
| 2020/0045615 A1* | 2/2020 | Karimli ................. H04W 48/08 |
| 2020/0112902 A1* | 4/2020 | Kamei ................... H04W 76/27 |
| 2020/0221506 A1* | 7/2020 | Jeon ..................... H04W 74/0833 |
| 2020/0235885 A1* | 7/2020 | Su .......................... H04W 72/23 |
| 2020/0275316 A1* | 8/2020 | Liu ................... H04W 28/0861 |
| 2020/0296765 A1 | 9/2020 | Kim et al. |
| 2021/0306844 A1* | 9/2021 | Xue ....................... H04W 92/20 |
| 2022/0272590 A1* | 8/2022 | Uemura ................ H04W 72/04 |

FOREIGN PATENT DOCUMENTS

| | | |
|---|---|---|
| KR | 10-2018-0116313 A | 10/2018 |
| KR | 10-2019-0069417 A | 6/2019 |
| WO | 2017/061643 A1 | 4/2017 |

OTHER PUBLICATIONS

Sriharsha M.R. et al., "A complete cell search and synchronization in LTE", EURASIP Journal on Wireless Communications and Networking, 2017, https://jwcn-eurasipjournals.springeropen.com/articles/10.1186/s13638-017-0886-3.

International Search Report dated Jun. 10, 2021, issued in PCT Patent Application No. PCT/KR2021/002119.

* cited by examiner

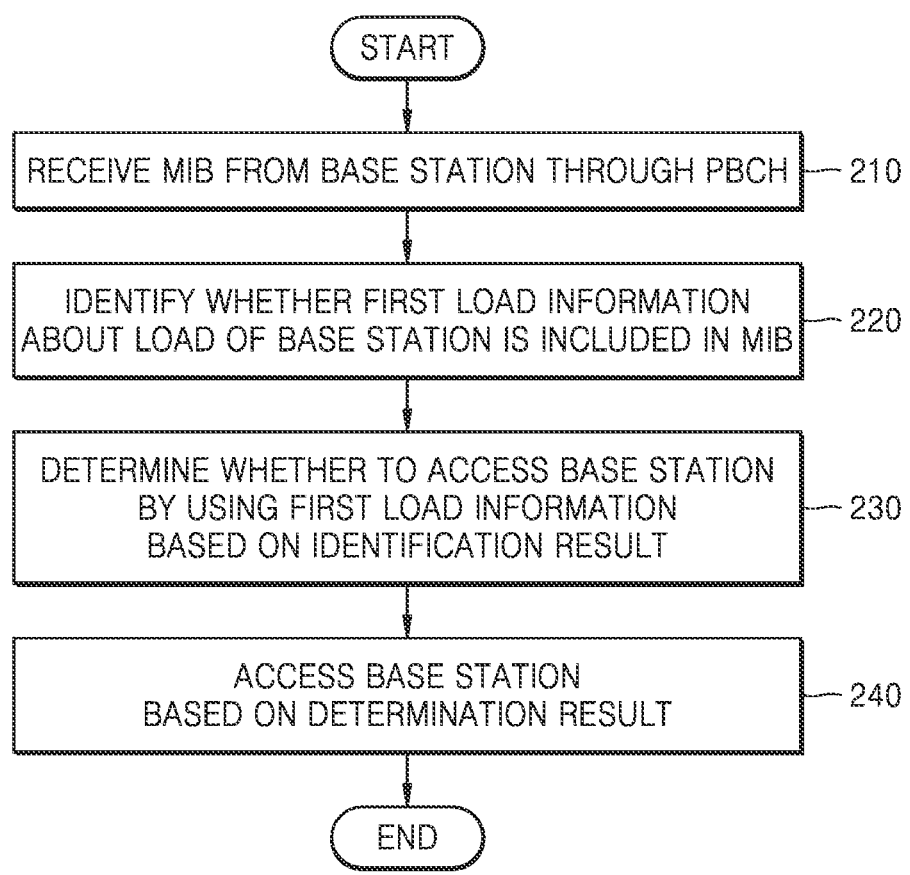

FIG. 3A

| bit | BS frequency Load | CPU Load |
|---|---|---|
| 0 | $L_f \leq p_{f1}$ (ex. 85%) | $L_c \leq p_{c1}$ (ex. 90%) |
| 1 | $L_f \leq p_{f1}$ | $L_c > p_{c1}$ |
| | $L_f > p_{f1}$ | $L_c \leq p_{c1}$ |
| | | $L_c > p_{c1}$ |

FIG. 3B

| bit | BS frequency Load | CPU Load |
|---|---|---|
| 00 | $L_f \leq p_{f1}$(ex. 25%) | $L_c \leq p_{c1}$(ex. 90%) |
| 01 | $p_{f1} < L_f \leq p_{f2}$(ex. 50%) | $L_c \leq p_{c1}$ |
| 10 | $p_{f2} < L_f \leq p_{f3}$(ex. 75%) | $L_c \leq p_{c1}$ |
| 11 | $p_{f3} < L_f$ | $L_c \leq p_{c1}$ |
|  | any case | $L_c > p_{c1}$ |

METHOD FOR TERMINAL TO CONTROL CONNECTION TO BASE STATION ON BASIS OF LOAD OF BASE STATION IN WIRELESS COMMUNICATION SYSTEM

TECHNICAL FIELD

The disclosure relates to a method by which a terminal controls access to a base station based on a load of the base station in a wireless communication system, and the terminal therefor.

BACKGROUND ART

To meet the explosively increasing demand with respect to wireless data traffic due to the commercialization of 4th generation (4G) communication systems and the increase of multimedia services, 5th generation (5G) or pre-5G communication systems have been developed. For this reason, 5G or pre-5G communication systems are called 'beyond 4G network' communication systems or 'post Long Term Evolution (post-LTE)' systems.

To increase data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

To improve network performance for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server or the like. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technologies including beamforming, MIMO, array antennas, and the like. Application of a cloud RAN as the above-described big data processing technology may be an example of convergence of 5G communication technology and IoT technology.

As various services may be provided according to the above features and the development of wireless communication systems, there is a demand for a scheme for supporting a method by which a terminal identifies a base station having good communication quality.

In order for a terminal to communicate with a base station having good communication quality, the terminal may connect to a base station having the greatest received signal strength. However, the strength of a received signal may not accurately represent information about the load of a base station. Thus, when the terminal selects a base station by using only the strength of a received signal, battery consumption and information throughput of the terminal may not be optimized according to the load situation of the base station and the efficiency of resource allocation by the network may not be optimized. Therefore, there is a need for a method by which a terminal may obtain information about the load of a base station and a method by which a terminal may select a base station according to the load of the base station.

DESCRIPTION OF EMBODIMENTS

Solution to Problem

The disclosure provides a method by which a terminal controls access to a base station based on a load of the base station in a wireless communication system, and the terminal therefor.

Also, the disclosure provides a method by which a base station transmits load information to a terminal in a wireless communication system, and the base station therefor.

BRIEF DESCRIPTION OF DRAWINGS

FIG. 2 is a flowchart for describing a method by which a terminal controls access to a base station, according to an embodiment of the disclosure.

FIG. 3A is a diagram for describing a method of identifying load information of a base station through an information bit, according to an embodiment of the disclosure.

FIG. 3B is a diagram for describing a method of identifying load information of a base station through an information bit, according to an embodiment of the disclosure.

BEST MODE

Figure 1A:
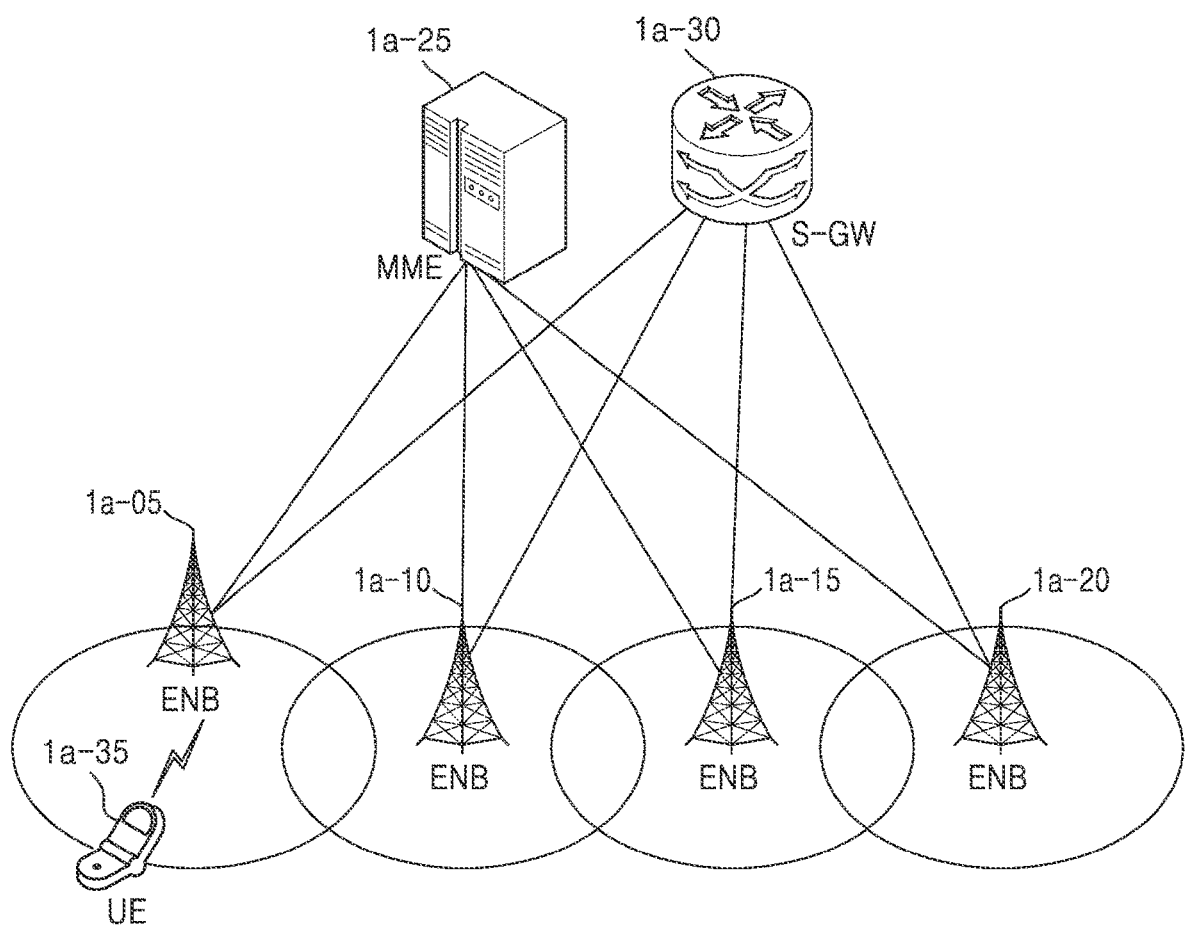
FIG. 1A is a diagram illustrating a structure of an LTE system according to an embodiment of the disclosure.

According to an embodiment of the disclosure, a method, performed by a terminal, of controlling access to a base station in a wireless communication system includes: receiving a master information block (MIB) from a base station through a physical broadcast channel (PBCH); identifying whether first load information about a load of the base station is included in the MIB; determining whether to access the base station by using the first load information based on a result of the identifying; and accessing the base station based on a result of the determining.

According to an embodiment of the disclosure, the first load information may include at least one of information about a frequency load of the base station or information about a central processing unit (CPU) load of the base station.

According to an embodiment of the disclosure, the first load information may be broadcast by using a certain information bit field in the MIB.

According to an embodiment of the disclosure, the certain information bit field may include at least one reserved bit or a spare bit string in the MIB.

According to an embodiment of the disclosure, a degree of the load of the base station may be divided into a plurality of levels and the certain information bit field may include information indicating one of the plurality of levels, and the determining of whether to access the base station by using the first load information may include determining to access the base station when the degree of the load of the base station is less than or equal to a certain threshold value.

According to an embodiment of the disclosure, the method further include: receiving a system information block (SIB) including second load information about the load of the base station from the base station through a physical downlink shared channel (PDSCH); and determining whether to access the base station by using at least one of the first load information or the second load information.

According to an embodiment of the disclosure, the method further include: receiving downlink control information (DCI) including third load information about the load of the base station from the base station through a physical downlink control channel (PDCCH); and controlling a connection with the base station based on the third load information.

According to an embodiment of the disclosure, a method, performed by a base station of transmitting load information to a terminal in a wireless communication system includes: determining a degree of a frequency load of a base station by using resource scheduling information of a medium access control (MAC) scheduler; including information about the degree of the frequency load in a master information block (MIB) or a system information block (SIB); and broadcasting the MIB and the SIB, wherein the information about the degree of the frequency load includes information about one of a plurality of intervals representing the degree of the frequency load.

According to an embodiment of the disclosure, the including of the information about the degree of the frequency load in the MIB may include including the information about the degree of the frequency load in the MIB by using a certain information bit field in the MIB.

According to an embodiment of the disclosure, the method may further include: determining a central processing unit (CPU) load of the base station; and including information about the CPU load in the MIB or the SIB.

According to an embodiment of the disclosure, the method may further include: including information about the degree of the frequency load in downlink control information (DCI); and transmitting the DCI to a terminal through a physical downlink control channel (PDCCH).

According to an embodiment of the disclosure, a terminal for controlling access to a base station in a wireless communication system includes: a transceiver; and at least one processor configured to receive a master information block (MIB) from a base station through a physical broadcast channel (PBCH) by controlling the transceiver, identify whether first load information about a load of the base station is included in the MIB, determine whether to access the base station by using the first load information based on a result of the identifying, and access the base station based on a result of the determining.

According to an embodiment of the disclosure, a base station for transmitting load information to a terminal in a wireless communication system includes: a transceiver; and at least one processor configured to determine a degree of a frequency load of a base station by using resource scheduling information of a medium access control (MAC) scheduler, include information about the degree of the frequency load in a master information block (MIB) or a system information block (SIB), and broadcast the MIB and the SIB by controlling the transceiver, wherein the information about the degree of the frequency load includes information about one of a plurality of intervals representing the degree of the frequency load.

MODE OF DISCLOSURE

Hereinafter, operation principles of the disclosure will be described in detail with reference to the accompanying drawings. In the following description of the disclosure, detailed descriptions of well-known functions or configurations will be omitted because they would unnecessarily obscure the subject matters of the disclosure. Also, terms described below may be terms defined considering functions in the disclosure and may vary according to users' or operators' intentions or practices. Therefore, the definition thereof should be made based on the content throughout the specification.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

The advantages and features of the disclosure and the accomplishing methods thereof will become apparent from the embodiments of the disclosure described below in detail with reference to the accompanying drawings. The disclosure may, however, be embodied in many different forms and should not be construed as being limited to the embodiments of the disclosure described below; rather, the embodiments are provided to complete the disclosure and fully convey the scope of the disclosure to those of ordinary skill in the art and the disclosure will be defined only by the scope of the claims. Throughout the specification, like reference numerals may denote like elements.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-executable or computer-readable memory that may be directed to a computer or other programmable data processing equipment to implement a function in a particular manner, the instructions stored in the computer-executable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "unit" used in the present embodiments may refer to a software component or a hardware component such as a field programmable gate array (FPGA) or an application specific integrated circuit (ASIC) and the "unit" may perform certain functions. However, the "unit" is not limited to software or hardware. The "unit" may be configured to be in an addressable storage medium or may be configured to operate one or more processors. Thus, as an example, the "unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "units" may be associated with the smaller number of components and "units" or may be further divided into additional components and "units". In addition, the components and "units" may be implemented to operate one or more central processing units (CPUs) in a device or a security multimedia card. Also, in embodiments, the "unit" may include one or more processors.

In the following description of the disclosure, detailed descriptions of well-known functions or configurations will be omitted because they would unnecessarily obscure the subject matters of the disclosure. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are used for convenience of description. Thus, the disclosure is not limited to the terms used below and other terms referring to objects having equivalent technical meanings may be used.

In the following description, terms and names defined in the 3rd Generation Partnership Project Long Term Evolution (3GPP LTE) standards may be used for convenience of description. However, the disclosure is not limited to those terms and names and may be equally applied to systems according to other standards. In the disclosure, eNB may be used interchangeably with gNB for convenience of description. That is, a base station described as an eNB may represent a gNB.

Hereinafter, a base station may be an agent performing terminal resource allocation and may be at least one of a gNode B, an eNode B, a Node B, a base station (BS), a radio access unit, a base station controller, or a node on a network. Examples of the terminal may include a user equipment (UE), a mobile station (MS), a cellular phone, a smartphone, a computer, or a multimedia system capable of performing a communication function. However, the disclosure is not limited thereto.

Particularly, the disclosure may be applied to 3GPP NR (5G mobile communication standards). Also, the disclosure may be applied to intelligent services (e.g., smart home, smart building, smart city, smart car or connected car, health care, digital education, retail business, security, and safety-related services) based on 5G communication technology and IoT technology. In the disclosure, eNB may be used interchangeably with gNB for convenience of description. That is, a base station described as an eNB may represent a gNB. Also, the term "terminal" may refer to other wireless communication devices in addition to mobile phones, NB-IoT devices, and sensors.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), and LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The uplink may refer to a radio link for transmitting data or a control signal from a terminal (e.g., a user equipment (UE) or a mobile station (MS)) to a base station (e.g., an eNode B (eNB) or a base station (BS)), and the downlink may refer to a radio link for transmitting data or a control signal from the base station to the terminal. The above-described multiple access schemes distinguish between data or control information of different users by allocating time-frequency resources for the data or control information of the users not to overlap each other, that is, to achieve orthogonality therebetween.

As post-LTE systems, 5G systems may have to support services capable of simultaneously satisfying various requirements because they may have to freely reflect various requirements of users, service providers, and the like. Services considered for the 5G systems may include enhanced mobile broadband (eMBB), massive machine-type communication (mMTC), and ultra-reliability low-latency communication (URLLC) services.

According to an embodiment of the disclosure, the eMBB may aim to provide an improved data rate than the data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Also, the 5G communication system may have to provide an increased user-perceived data rate of a terminal while providing a peak data rate. In order to satisfy this requirement, the 5G communication system may require the improvement of various transmission/reception technologies including a more improved Multi Input Multi Output (MIMO) transmission technology. Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the current LTE.

Simultaneously, the mMTC is being considered to support application services such as Internet of Thing (IoT) in 5G communication systems. In order to efficiently provide the IoT, the mMTC may require the support for access of large terminals in a cell, improved terminal coverage, improved battery time, reduced terminal cost, and the like. Because the IoT is attached to various sensors and various devices to provide a communication function, it should be able to support a large number of terminals (e.g., 1,000,000 terminals/km2) in a cell. Also, because a terminal supporting the mMTC is likely to be located in a shadow area failing to be covered by the cell, such as the basement of a building, due to the characteristics of the service, it may require wider coverage than other services provided by the 5G communication systems. The terminal supporting the mMTC should be configured as a low-cost terminal and may require a very long battery life time of about 10 years to about 15 years because it is difficult to frequently replace the battery of the terminal.

Lastly, the URLLC may be used in services for remote control of robots or machinery, industrial automation, unmanned aerial vehicles, remote health care, emergency alerts, and the like, as cellular-based wireless communication services used for mission-critical purposes. Thus, the communication provided by the URLLC may have to provide very low latency (ultra-low latency) and very high reliability (ultra-high reliability). For example, a service supporting the URLLC should satisfy an air interface latency of less than 0.5 milliseconds and simultaneously may have a requirement for a packet error rate of $10^{-5}$ or less. Thus, for the service supporting the URLLC, the 5G system should provide a smaller transmit time interval (TTI) than other services and simultaneously may have a design requirement for allocating wide resources in frequency bands in order to secure the reliability of communication links.

The above three services of eMBB, URLLC, and mMTC considered in the 5G communication systems may be multiplexed and transmitted in one system. In this case, different transmission/reception techniques and transmission/reception parameters may be used between services in order to satisfy different requirements of the respective services. However, the above-described mMTC, URLLC, and eMBB are merely examples of different service types, and the service types to which the disclosure is applied are not limited thereto.

Also, although embodiments of the disclosure will be described below by using an LTE, LTE-A, LTE Pro, or 5G (or NR, next-generation mobile communication) as an example, the embodiments of the disclosure may also be applied to other communication systems having similar technical backgrounds or channel forms. Also, the embodiments of the disclosure may also be applied to other communication systems through some modifications without departing from the scope of the disclosure by the judgment of those of ordinary skill in the art.

Hereinafter, an LTE system, an NR system, and an RRC connection reconfiguration procedure according to an embodiment of the disclosure will be described with reference to FIGS. 1A to 1F.

FIG. 1A is a diagram illustrating a structure of an LTE system according to an embodiment of the disclosure.

Referring to FIG. 1A, as illustrated, a radio access network of the LTE system may include next-generation base stations (e.g., evolved Node Bs (eNBs), Node Bs, or base stations) 1a-05, 1a-10, 1a-15, and 1a-20, a mobility management entity (MME) 1a-25, and a serving-gateway (S-GW) 1a-30. A user terminal (e.g., a user equipment (UE) or a terminal) 1a-35 may access an external network through the eNBs 1a-05 to 1a-20 and the S-GW 1a-30.

In FIG. 1A, the eNBs 1a-05 to 1a-20 may correspond to the existing Node Bs of a Universal Mobile Telecommunication System (UMTS) system. The eNB may be connected to the UE 1a-35 through a radio channel and may perform a more complex function than the existing Node B. In the LTE system, because all user traffic including real-time services such as Voice over IP (VoIP) through the Internet protocol is serviced through a shared channel, an apparatus for collecting and scheduling state information such as UEs' buffer states, available transmission power states, or channel states may be required, which may be managed by the eNBs 1a-05 to 1a-20. One eNB may generally control a plurality of cells. For example, in order to implement a transmission rate of 100 Mbps, the LTE system may use orthogonal frequency division multiplexing (OFDM) in a 20 MHz bandwidth as a radio access technology. However, the disclosure is not limited thereto. Also, the eNBs 1a-05 to 1a-20 may apply an adaptive modulation & coding (AMC) scheme to determine a modulation scheme and a channel coding rate according to the channel state of a terminal. The S-GW 1a-30 may be an apparatus for providing a data bearer and may generate (add) or remove (release) a data bearer under the control by the MME 1a-25. The MME may be an apparatus for performing various control functions as well as a mobility management function for a terminal and may be connected to a plurality of base stations.

Figure 1B:
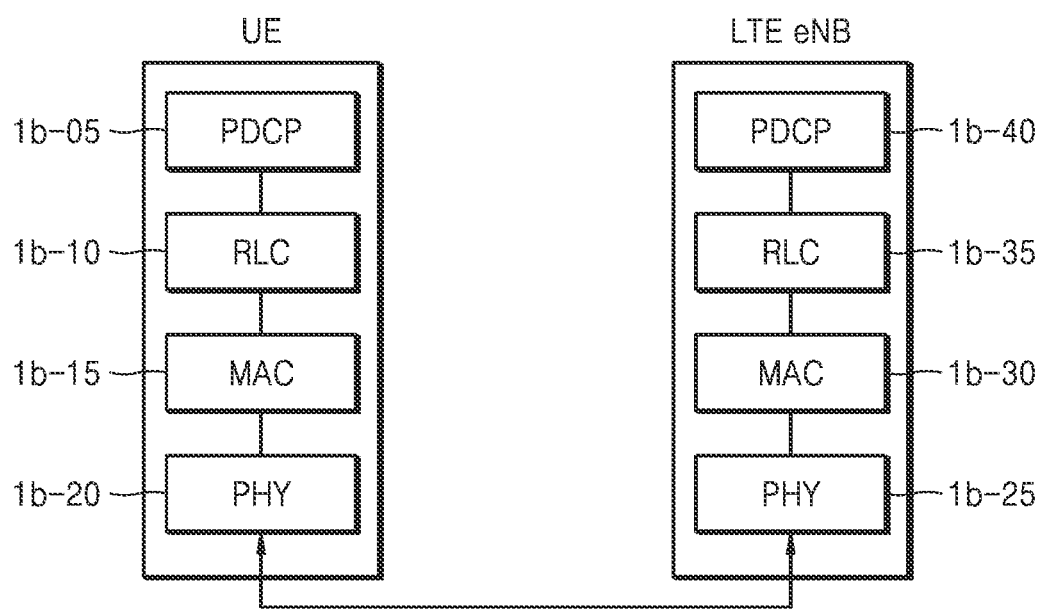
FIG. 1B is a diagram illustrating a radio protocol architecture in an LTE system according to an embodiment of the disclosure.

FIG. 1B is a diagram illustrating a radio protocol architecture in an LTE system according to an embodiment of the disclosure.

Referring to FIG. 1B, the radio protocol of the LTE system may include Packet Data Convergence Protocol (PDCP) 1b-05 and 1b-40, Radio Link Control (RLC) 1b-10 and 1b-35, and Medium Access Control (MAC) 1b-15 and 1b-30 in a terminal and an eNB, respectively. The PDCP 1b-05 and 1b-40 may perform operations such as IP header compression/decompression. The main functions of the PDCP may be summarized as follows. However, the disclosure is not limited to the following examples.

Header compression and decompression function (Header compression and decompression: ROHC only)
  User data transmission function (Transfer of user data)
  Sequential transmission function (In-sequence delivery of upper layer PDUs at PDCP re-establishment procedure for RLC AM)
  Reordering function (For split bearers in DC (only support for RLC AM): PDCP PDU routing for transmission and PDCP PDU reordering for reception)
  Duplicate detection function (Duplicate detection of lower layer SDUs at PDCP re-establishment procedure for RLC AM)
  Retransmission function (Retransmission of PDCP SDUs at handover and, for split bearers in DC, of PDCP PDUs at PDCP data-recovery procedure, for RLC AM)
  Ciphering and deciphering function (Ciphering and deciphering)
  Timer-based SDU discard function (Timer-based SDU discard in uplink)

The radio link control (RLC) 1b-10 and 1b-35 may reconfigure a PDCP packet data unit (PDU) in a suitable size to perform an ARQ operation or the like. The main functions of the RLC may be summarized as follows. However, the disclosure is not limited to the following examples.

Data transmission function (Transfer of upper layer PDUs)
  ARQ function (Error Correction through ARQ (only for AM data transfer))
  Concatenation, segmentation, and reassembly function (Concatenation, segmentation, and reassembly of RLC SDUs (only for UM and AM data transfer))
  Re-segmentation function (Re-segmentation of RLC data PDUs (only for AM data transfer))
  Reordering function (Reordering of RLC data PDUs (only for UM and AM data transfer))
  Duplicate detection function (Duplicate detection (only for UM and AM data transfer))
  Error detection function (Protocol error detection (only for AM data transfer))
  RLC SDU discard function (RLC SDU discard (only for UM and AM data transfer))
  RLC re-establishment function (RLC re-establishment)

The MAC 1b-15 and 1b-30 may be connected to several RLC entities configured in one terminal and may perform an operation of multiplexing RLC PDUs into MAC PDUs and demultiplexing RLC PDUs from MAC PDUs. The main functions of the MAC may be summarized as follows. However, the disclosure is not limited to the following examples.

Mapping function (Mapping between logical channels and transport channels)
  Multiplexing and demultiplexing function (Multiplexing/demultiplexing of MAC SDUs belonging to one or different logical channels into/from transport blocks (TB) delivered to/from the physical layer on transport channels)
  Scheduling information report function (Scheduling information reporting)
  HARQ function (Error correction through HARQ)
  Priority handling function between logical channels (Priority handling between logical channels of one UE)
  Priority handling function between terminals (Priority handling between UEs by means of dynamic scheduling)
  MBMS service identification function (MBMS service identification)
  Transport format selection function (Transport format selection)
  Padding function (Padding)

Physical layers 1b-20 and 1b-25 may channel-code and modulate upper layer data, generate OFDM symbols, and transmit the same on radio channels or may demodulate and channel-decode OFDM symbols received on radio channels and transmit the result thereof to the upper layer. However, the disclosure is not limited thereto.

Figure 1C:
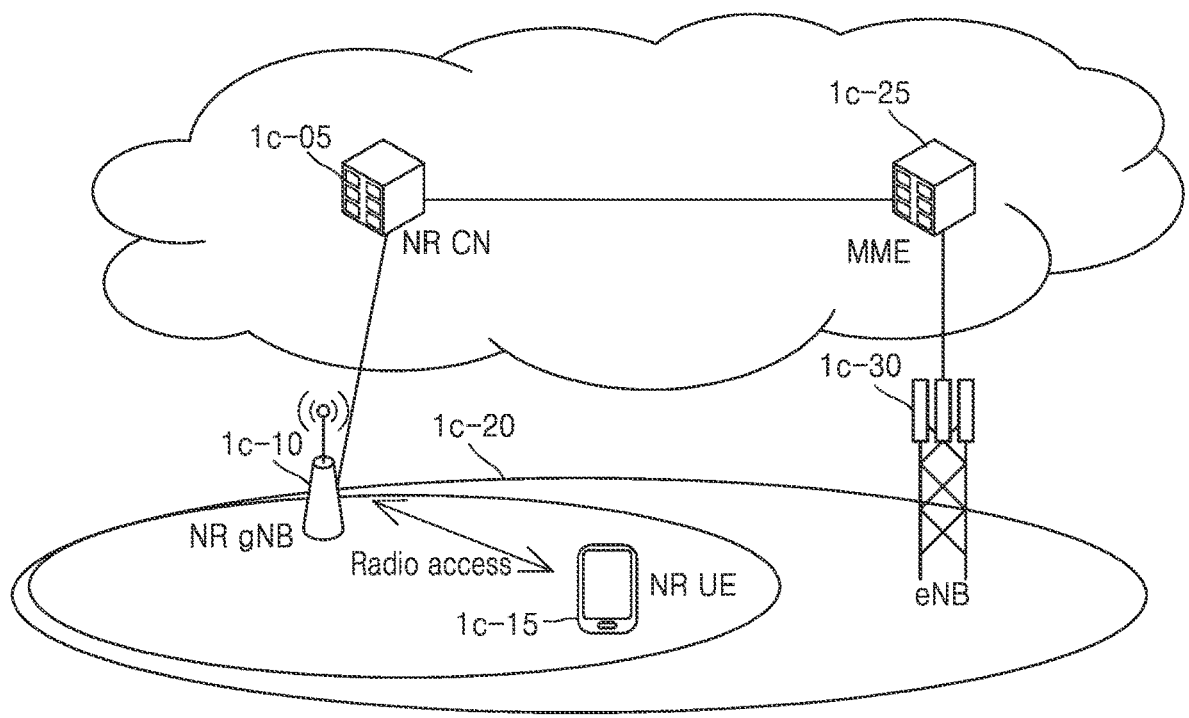
FIG. 1C is a diagram illustrating a structure of a next-generation mobile communication system according to an embodiment of the disclosure.

FIG. 1C is a diagram illustrating a structure of a next-generation mobile communication system according to an embodiment of the disclosure.

Referring to FIG. 1C, a radio access network of the next-generation mobile communication system (hereinafter NR or 5G) may include a next-generation base station (e.g., a New Radio Node B (NR gNB) or an NR base station) 1c-10 and a New Radio Core Network (NR CN) 1c-05. A user terminal (e.g., a new radio user equipment (NR UE) or a terminal) 1c-15 may access an external network through the NR gNB 1c-10 and the NR CN 1c-05.

In FIG. 1C, the NR gNB 1c-10 may correspond to an evolved Node B (eNB) of the existing LTE system. The NR gNB may be connected to the NR UE 1c-15 through a radio channel and may provide a better service than the existing Node B. In the next-generation mobile communication system, because all user traffic is serviced through a shared channel, an apparatus for collecting and scheduling state information such as UEs' buffer states, available transmission power states, or channel states may be required, which may be managed by the NR gNB 1c-10. One NR gNB may generally control a plurality of cells. According to an embodiment of the disclosure, in order to implement ultra-high speed data transmission in comparison with the LTE, the next-generation mobile communication system may have an existing maximum bandwidth or more and may additionally use a beamforming technology by using orthogonal frequency division multiplexing (OFDM) as a radio access technology. Also, according to an embodiment of the disclosure, the NR gNB 1c-10 may apply an adaptive modulation & coding (AMC) scheme to determine a modulation scheme and a channel coding rate according to the channel state of a terminal. The NR CN 1c-05 may perform functions such as mobility support, bearer configuration, and Quality of Service (QoS) configuration. The NR CN 1c-05 may be an apparatus for performing various control functions as well as a mobility management function for a terminal and may be connected to a plurality of base stations. Also, the next-generation mobile communication system may also be linked with the existing LTE system, and the NR CN 1c-05 may be connected to an MME 1c-25 through a network interface. The MME may be connected to an eNB 1c-30 that is an existing base station.

Figure 1D:
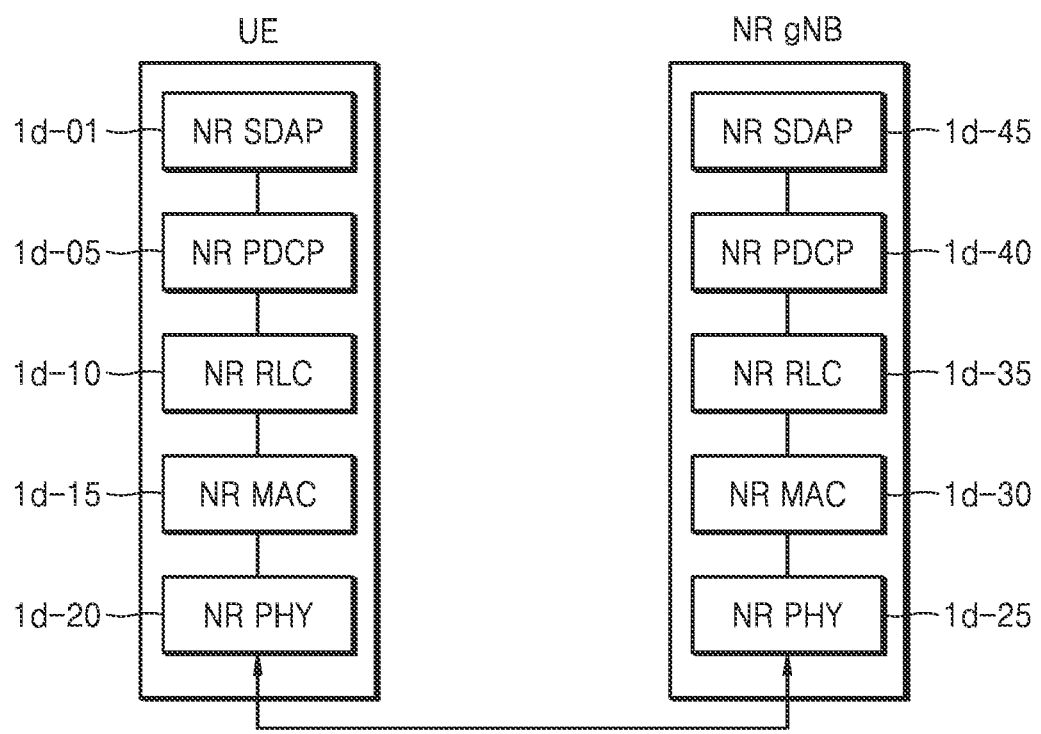
FIG. 1D is a diagram illustrating a radio protocol architecture of a next-generation mobile communication system according to an embodiment of the disclosure.

FIG. 1D is a diagram illustrating a radio protocol architecture of a next-generation mobile communication system according to an embodiment of the disclosure.

Referring to FIG. 1D, the radio protocol of the next-generation mobile communication system may include NR Service Data Adaptation Protocol (SDAP) 1d-01 and 1d-45, NR PDCP 1d-05 and 1d-40, NR RLC 1d-10 and 1d-35, and NR MAC 1d-15 and 1d-30 in a terminal and an NR base station, respectively.

According to an embodiment of the disclosure, the main functions of the NR SDAP 1d-01 and 1d-45 may include some of the following functions. However, the disclosure is not limited to the following examples.

User data transmission function (Transfer of user plane data)

Function of mapping between QoS flow and data bearer for uplink and downlink (Mapping between a QoS flow and a DRB for both DL and UL)

Function of marking QoS flow ID for uplink and downlink (Marking QoS flow ID in both DL and UL packets)

Function of mapping reflective QoS flow to data bearer for uplink SDAP PDUs (Reflective QoS flow to DRB mapping for the UL SDAP PDUs)

As for an SDAP entity, the terminal may be configured with information about whether to use a header of the SDAP entity or whether to use a function of the SDAP entity, by a Radio Resource Control (RRC) message, for each PDCP entity, for each bearer, or for each logical channel. When the SDAP header is configured, a non-access stratum (NAS) QoS reflective configuration 1-bit indicator (NAS reflective QoS) and an access stratum (AS) QoS reflective configuration 1-bit indicator (AS reflective QoS) of the SDAP header may indicate the terminal to update or reconfigure mapping information between a QoS flow and a data bearer for an uplink and a downlink. The SDAP header may include QoS flow ID information representing the QoS. Also, according to an embodiment of the disclosure, the QoS information may be used as data processing priority and scheduling information or the like to support a smooth service.

According to an embodiment of the disclosure, the main functions of the NR PDCP 1d-05 and 1d-40 may include some of the following functions. However, the disclosure is not limited to the following examples.

Header compression and decompression function (Header compression and decompression: ROHC only)

User data transmission function (Transfer of user data)

Sequential transmission function (In-sequence delivery of upper layer PDUs)

Non-sequential transmission function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink)

According to an embodiment of the disclosure, the reordering function of the NR PDCP entity may mean a function of reordering the PDCP PDUs received from the lower layer in order based on a PDCP sequence number (SN). The reordering function of the NR PDCP entity may include at least one of a function of transmitting data to the upper layer in the reordered order, a function of directly transmitting data without considering the order, a function of rearranging the order and recording the missing PDCP PDUs, a function of reporting the state of the missing PDCP PDUs to the transmitting side, or a function of requesting retransmission of the missing PDCP PDUs.

According to an embodiment of the disclosure, the main functions of the NR RLC 1d-10 and 1d-35 may include some of the following functions. However, the disclosure is not limited to the following examples.

Data transmission function (Transfer of upper layer PDUs)

Sequential transmission function (In-sequence delivery of upper layer PDUs)

Non-sequential transmission function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU discard function (RLC SDU discard)

RLC re-establishment function (RLC re-establishment)

According to an embodiment of the disclosure, the sequential transmission (in-sequence delivery) function of the NR RLC entity may mean a function of sequentially transmitting the RLC SDUs received from the lower layer to the upper layer. When one original RLC SDU is segmented into multiple RLC SDUs and received, the above function may include at least one of a function of reassembling and transmitting the received RLC SDUs, a function of reordering the received RLC PDUs based on the RLC sequence number (SN) or the PDCP sequence number (SN), a function of reordering the sequence and recording missing RLC PDUs, a function of reporting the state of missing RLC PDUs to the transmitting side, a function of requesting retransmission of missing RLC PDUs, a function of, when there is a missing RLC SDU, sequentially transmitting only the RLC SDUs before the missing RLC SDU to the upper layer, a function of, when a certain timer has expired even when there is a missing RLC SDU, sequentially transmitting all the RLC SDUs received before the start of the timer to the upper layer, or a function of, when a certain timer has expired even when there is a missing RLC SDU, sequentially transmitting all the RLC SDUs received until now to the upper layer.

Also, according to an embodiment of the disclosure, the NR RLC entity may process the RLC PDUs in order of reception (in order of arrival regardless of the order of sequence numbers) and then transmit the same to the PDCP entity regardless of the sequence (out-of-sequence delivery), and in the case of segments, the segments stored in the buffer or to be received later may be received, reconfigured into one complete RLC PDU, and then processed and transmitted to the PDCP entity.

Also, according to an embodiment of the disclosure, the NR RLC layer may not include the concatenation function, and this function may be performed in the NR MAC layer or may be replaced with the multiplexing function of the NR MAC layer.

Also, according to an embodiment of the disclosure, the non-sequential transmission function (out-of-sequence delivery) of the NR RLC entity may include at least one of a function of immediately transmitting RLC SDUs received from the lower layer to the upper layer regardless of the sequence or a function of, when one original RLC SDU is segmented into multiple RLC SDUs and received, reassembling and transmitting the same, and may include a function of storing the RLC SN or PDCP SN of received RLC PDUs, ordering the sequence, and recording missing RLC PDUs.

According to an embodiment of the disclosure, the NR MAC 1d-15 and 1d-30 may be connected to multiple NR RLC entities configured in one terminal, and the main functions of the NR MAC may include some of the following functions. However, the disclosure is not limited to the following examples.

- Mapping function (Mapping between logical channels and transport channels)
- Multiplexing and demultiplexing function (Multiplexing/demultiplexing of MAC SDUs)
- Scheduling information report function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

According to an embodiment of the disclosure, NR PHY layers 1d-20 and 1d-25 may channel-code and modulate upper layer data, generate OFDM symbols, and transmit the same on radio channels or may demodulate and channel-decode OFDM symbols received on radio channels and transmit the results thereof to the upper layer. However, the disclosure is not limited thereto.

Figure 1E:
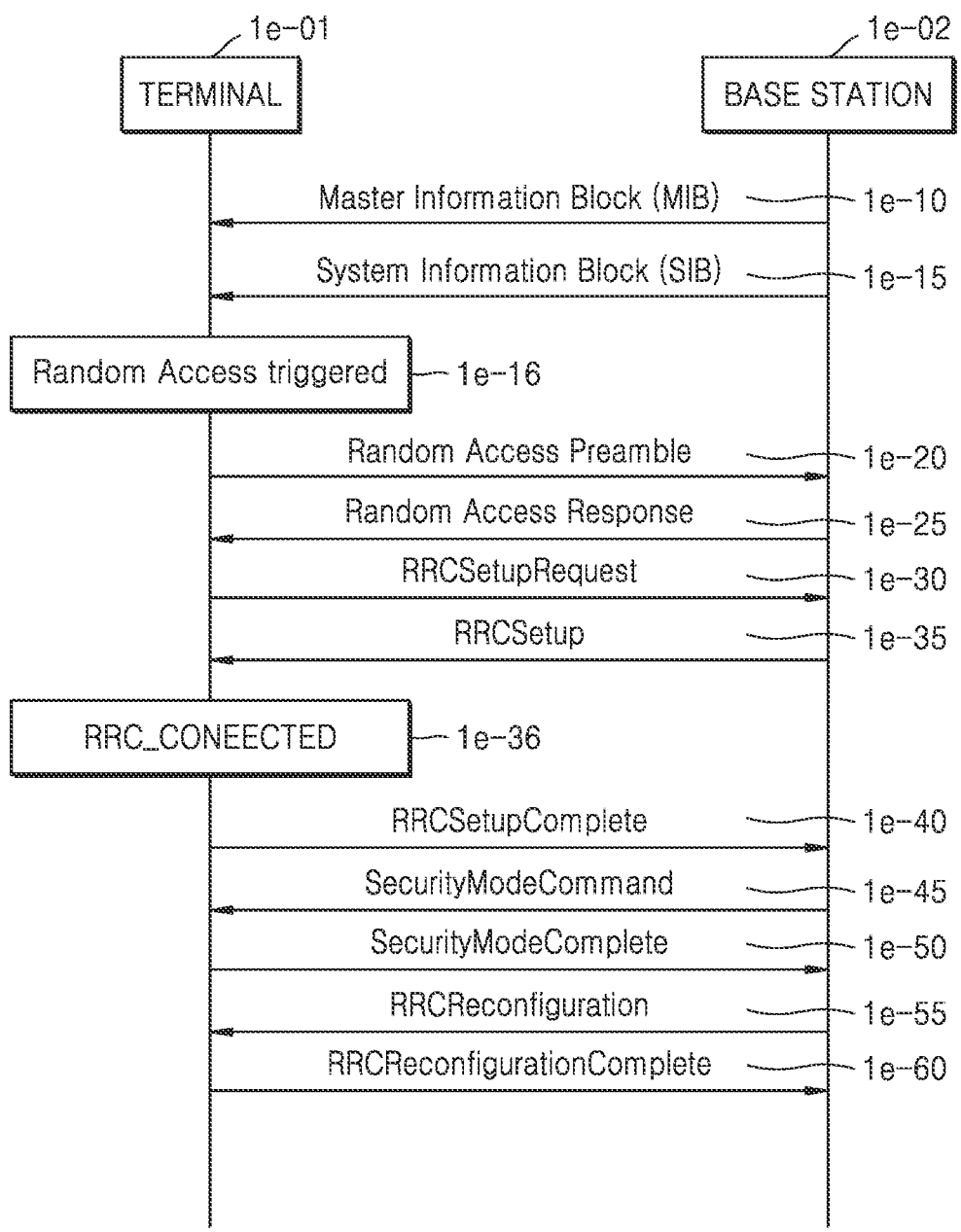
FIG. 1E is a diagram illustrating a procedure in which a terminal switches from an RRC idle mode (RRC_IDLE) to an RRC connected mode (RRC_CONNECTED) by configuring a connection with a base station, according to an embodiment of the disclosure.

FIG. 1E is a diagram illustrating a procedure in which a terminal switches from an RRC idle mode (RRC_IDLE) to an RRC connected mode (RRC_CONNECTED) by configuring a connection with a base station, according to an embodiment of the disclosure.

Referring to FIG. 1E, in the RRC idle mode, through a cell selection procedure and/or a cell reselection procedure, a terminal 1e-01 may find and camp on a suitable cell to receive system information. The system information may be included and transmitted in a master information block (MIB) and a system information block (SIB). In operation 1e-10, the terminal 1e-01 may receive the MIB from a base station 1e-02 through a physical broadcast channel (PBCH). In operation 1e-15, the terminal 1e-01 may receive the system information block (SIB) from the base station 1e-02 through a physical downlink shared channel (PDSCH).

The terminal 1e-01 may perform a random access procedure to configure an RRC connection with the base station 1e-02. When the random access is triggered (1e-16), the terminal 1e-01 may select a PRACH occasion and transmit a random access preamble to the base station 1e-02 (1e-20). Upon receiving the random access preamble, the base station 1e-02 may transmit a random access response (RAR) message thereof to the terminal (1e-25). The terminal 1e-01 in the RRC idle mode may establish reverse transmission synchronization with the base station 1e-02 through operations 1e-20 and 1e-25.

The terminal 1e-01 in the RRC idle mode having established the reverse transmission synchronization may perform an RRC connection establishment procedure with the base station 1e-02. First, the terminal 1e-01 may transmit an RRC connection configuration request message (RRCSetupRequest message) to the base station (1e-30). The connection configuration request message may include an identifier (UE-Identity) and a cause (establishmentCause) for the terminal 1e-01 to configure an RRC connection. Upon receiving the RRC connection configuration request message, the base station 1e-02 may transmit an RRC connection configuration message (RRCSetup message) to the terminal (1e-35). The RRC connection configuration message may include radio bearer configuration information (radioBearerConfig) and master cell group configuration information (masterCellGroup). For example, the radio bearer configuration information and the master cell group configuration information may include at least one of information involving a signaling radio bearer 1 (SRB1) connection, RLC bearer configuration information about SRB1, MAC cell group configuration information (MAC-CellGroupConfig), or physical cell group configuration information (physicalCellGroupConfig). That is, the RRC connection establishment may involve an SRB1 connection and may not involve other radio bearer connections other than SRB1 (e.g., the RRC connection establishment may not involve an SRB2 for the terminal and the base station to transmit/receive a NAS message or a data radio bearer (DRB) connection for transmitting data. Upon receiving the RRC connection configuration message, the terminal 1e-01 may apply the received information and switch to the RRC connected mode (1e-36). The terminal 1e-01 having switched to the RRC connected mode may transmit an RRC connection configuration completion message (RRCSetupComplete message) to the base station 1e-02 through the SRB1 (1e-40). The RRC connection configuration completion message may include a service request message for the terminal 1e-01 to request an access and mobility management function (AMF) or an MME to configure a bearer for a certain service.

When the RRC connection establishment procedure is successfully performed, the base station 1e-02 may transmit a security mode command message (SecurityModeCommand message) to the terminal 1e-01 to activate an AS security with the terminal 1e-01 in the RRC connected mode (1e-45). Upon receiving the security mode command message, the terminal 1e-01 may transmit a security mode completion message (SecurityModeComplete message) to the base station (1e-50).

When transmitting the security mode command message, after the time of transmitting the security mode command message or after the time of receiving the security mode completion message, the base station 1e-02 may perform an RRC connection reconfiguration (RRC reconfiguration) procedure with the terminal 1e-01. First, the base station 1e-02 may transmit an RRC connection reconfiguration message (RRCReconfiguration message) to the terminal 1e-01 (1e-55). The RC connection reconfiguration message may include configuration information of the DRB in which user data is to be processed or configuration information of the SRB2 in which a NAS message is to be transmitted. Upon receiving the RRC connection reconfiguration message, the terminal 1e-01 may transmit an RRC connection reconfiguration completion message (RRCReconfigurationComplete message) to the base station 1e-02 (1e-60).

As described above, many signaling procedures may be required for the terminal 1e-01 to configure an RRC connection to switch from the RRC idle mode to the RRC connected mode. Thus, an RRC inactive mode (RRC_INACTIVE) may be newly defined in the next-generation mobile communication system. In a new mode such as the RRC inactive mode, because the terminal 1e-01 and the base station 1e-02 store the context of the terminal 1e-01, when the terminal 1e-01 in the RRC inactive mode attempts to access the network, it may be accessed and data may be transmitted/received faster with fewer signaling procedures through an RRC connection resumption procedure proposed below.

Figure 1F:
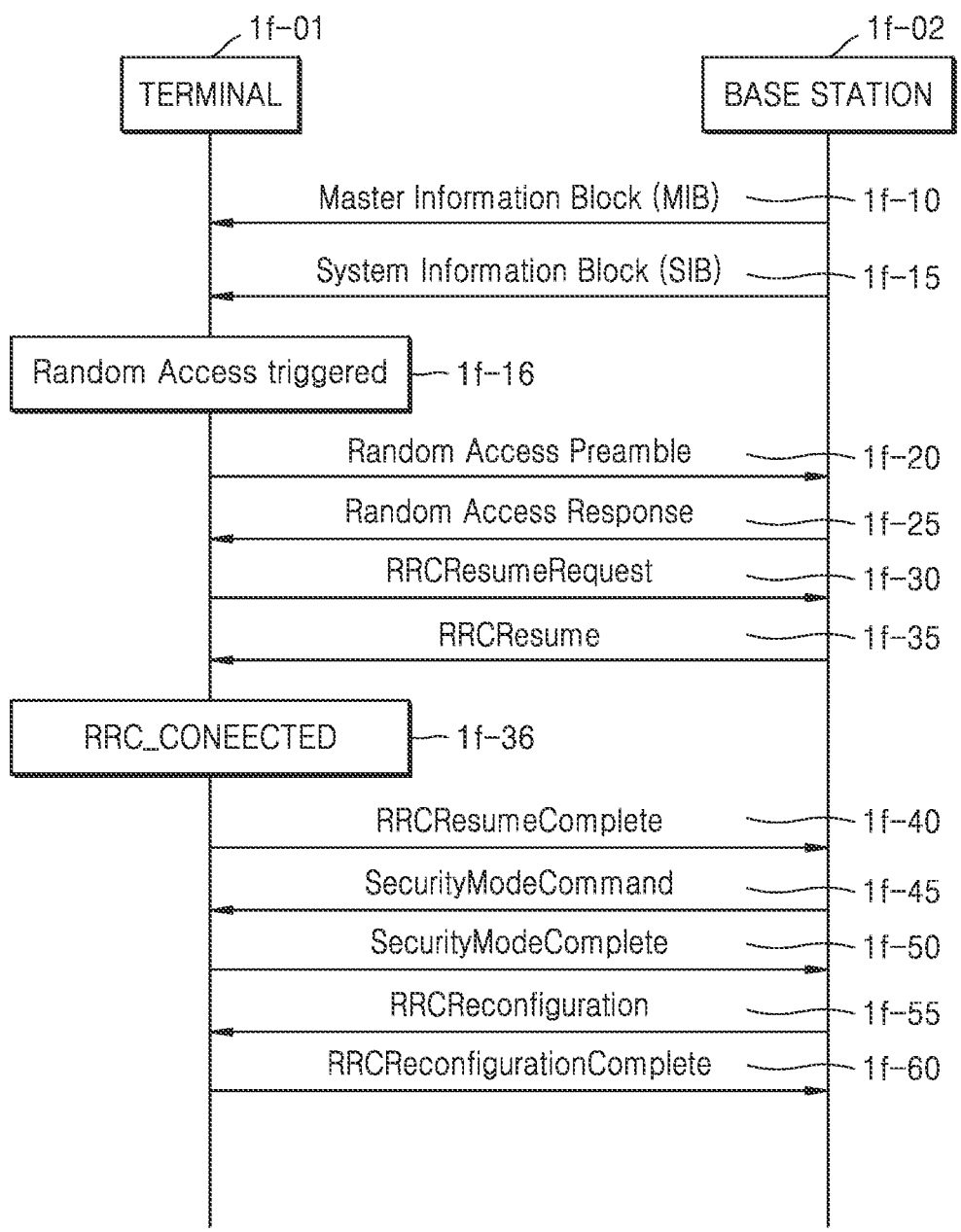
FIG. 1F is a diagram illustrating a procedure in which a terminal switches from an RRC inactive mode (RRC_INACTIVE) to an RRC connected mode (RRC_CON- NECTED) by configuring a connection with a base station, according to an embodiment of the disclosure.

FIG. 1F is a diagram illustrating a procedure in which a terminal switches from an RRC inactive mode (RRC_INACTIVE) to an RRC connected mode (RRC_CONNECTED) by configuring a connection with a base station, according to an embodiment of the disclosure.

Referring to FIG. 1F, in the RRC inactive mode, through a cell selection procedure and/or a cell reselection procedure, a terminal 1f-01 may find and camp on a suitable cell to receive system information. The system information may be included and transmitted in a master information block (MIB) and a system information block (SIB). In operation 1f-10, the terminal 1f-01 may receive the MIB from a base station 1f-02 through a physical broadcast channel (PBCH). In operation 1f-15, the terminal 1f-01 may receive the system information block (SIB) from the base station 1f-02 through a physical downlink shared channel (PDSCH).

The terminal 1f-01 may perform a random access procedure to resume an RRC connection with the base station 1f-02. When the random access is triggered (1f-16), the terminal 1f-01 may select a PRACH occasion and transmit a random access preamble to the base station (1f-20). Upon receiving the random access preamble, the base station 1f-02 may transmit a random access response (RAR) message thereof to the terminal 1f-01 (1f-25). The terminal 1f-01 in the RRC inactive mode may establish reverse transmission synchronization with the base station 1f-02 through operations 1f-20 and 1f-25.

The terminal 1f-01 in the RRC inactive mode having established the reverse transmission synchronization may perform an RRC connection resumption (RRC connection resume) procedure with the base station 1f-02. First, the terminal 1f-01 may transmit an RRC connection resumption request message (RRCResumeRequest message) or an RRC connection resumption request 1 message (RRCResumeRequest1 message) to the base station (1f-30). The RRC connection resumption request message or the RRC connection resumption request 1 message may include at least one of an identifier (resumeIdentity) of the terminal for recovering the terminal context to the base station 1f-02, resumption encryption information (resumeMAC-I), or a cause (resumeCause) for resuming the RRC connection. Upon receiving the RRC connection resumption request message or the RRC connection resumption request 1 message, the base station 1f-02 may transmit an RRC connection resumption message (RRCResume message) to the terminal 1f-01 (1f-35). The RRC connection resumption message may include at least one of radio bearer configuration information (radioBearerConfig), master cell group configuration information (masterCellGroup), or measurement configuration information (measConfig). For example, the radio bearer configuration information and the master cell group configuration information may include at least one of configuration information of one or more signaling radio bearers (SRBs) to be resumed, configuration information of one or more data radio bearers (DRBs), RLC bearer configuration information thereof, MAC cell group configuration information (mac-CellGroupConfig), or physical cell group configuration information (physicalCellGroupConfig).

Upon receiving the RRC connection resumption message, the terminal 1f-01 may apply the received information and switch to the RRC connected mode (1f-36). The terminal 1f-01 having switched to the RRC connected mode may transmit an RRC connection resumption completion message (RRCResumeComplete message) to the base station 1f-02 through the SRB1 (1f-40).

When the RRC connection resumption procedure is successfully performed, the base station 1f-02 may transmit a security mode command message (SecurityModeCommand message) to the terminal to activate an AS security with the terminal 1f-01 in the RRC connected mode (1f-45). Upon receiving the security mode command message, the terminal 1f-01 may transmit a security mode completion message (SecurityModeComplete message) to the base station 1f-02 (1f-50).

When transmitting the security mode command message, after the time of transmitting the security mode command message or after the time of receiving the security mode completion message, the base station 1f-02 may perform an RRC connection reconfiguration (RRC reconfiguration) procedure with the terminal 1f-01. First, the base station 1f-02 may transmit an RRC connection reconfiguration message (RRCReconfiguration message) to the terminal 1f-01 (1f-55). Upon receiving the RRC connection reconfiguration message, the terminal 1f-01 may transmit an RRC connection reconfiguration completion message (RRCReconfigurationComplete message) to the base station 1f-02 (1f-60).

Hereinafter, a method proposed in the disclosure in which a terminal controls access to a base station will be described in detail with reference to FIGS. 2 to 11.

FIG. 2 is a flowchart for describing a method by which a terminal controls access to a base station, according to an embodiment of the disclosure.

Referring to FIG. 2, in operation 210, the terminal according to an embodiment of the disclosure may receive a master information block (MIB) from the base station through a physical broadcast channel (PBCH).

The terminal may first obtain a synchronization signal of the base station before receiving system information from the base station. The terminal may receive and decode a primary synchronization signal (PSS) from the base station. The terminal may receive and decode a secondary synchronization signal (SSS) based on the decoded PSS information. The terminal may obtain synchronization information of the base station, such as a cell ID, a cell ID group, and frame timing, by using the PSS and the SSS. The terminal may synchronize with the base station according to the obtained synchronization information and transmit/receive a signal. The base station may broadcast the MIB through the PBCH, and the terminal may receive the MIB through the PBCH from the base station after synchronization with the base station.

According to an embodiment of the disclosure, the terminal may receive the MIB from another base station or a base station of a serving cell on which the terminal has currently camped. For example, the terminal may receive the MIB from a first base station of the serving cell in the RRC connected mode (RRC_CONNECTED). Also, in the RRC inactive mode (RRC_INACTIVE), the terminal may receive the MIB from a first base station of a cell on which the terminal has camped. Also, in the RRC connected mode (RRC_CONNECTED) or the RRC idle mode (RRC_IDLE), the terminal may receive the MIB from a base station of the serving cell or a second base station other than the base station on which the terminal has currently camped. For example, the terminal may camp on the second base station, obtain synchronization information of the second base station, and receive the MIB from the second base station. Also, in the RRC idle mode (RRC_IDLE), the terminal may camp on a certain base station and receive the MIB from the certain base station. However, the above is merely an example, and the terminal is not limited to the above example and may receive the MIB from various base stations in various operation modes or states.

In operation 220, the terminal according to an embodiment of the disclosure may identify whether first load information about the load of the base station is included in the MIB. The base station may broadcast the first load information about the load of the base station in the MIB. The terminal may receive the MIB and identify whether the first load information is included in the received MIB.

Herein, 'first load information', 'second load information', and 'third load information' may refer to information about the load of the base station. However, the terms 'first', 'second', and 'third' are merely for distinguishing between different paths through which load information is transmitted, and the types of information included in each load information may be the same. For example, the first load information may be included and transmitted in the master information block (MIB), the second load information may be included and transmitted in the system information block (SIB), and the third load information may be included and transmitted in the downlink control information (DCI). Thus, the description of the first load information may be analogously applied to the second load information and the third load information. However, a particular load value or a degree of a load indicated by each of the first load information, the second load information, and the third load information may be the same as or different from each other. Also, in some cases, the first load information, the second load information, and the third load information may include different types of information.

According to an embodiment of the disclosure, the first load information may include information about the frequency load of the base station. The information about the frequency load of the base station may include information about the ratio of the frequency resources available at a certain time to all the frequency resources available to the base station. The certain time may be, for example, the time when the base station determines the frequency load, the time when the base station broadcasts the MIB, or the time after a certain offset from the above two times, but is not limited to the above example and may be determined in various ways. The frequency resource available in the base station may refer to a frequency resource not scheduled by the base station or an unoccupied frequency resource. For example, when the total amount of frequency resources available to the base station is 100 and the amount of frequency resources currently scheduled by the base station is 70, because the amount of currently available frequency resources is 30, the information about the frequency load of the base station may be '0.3' or '30%'.

Also, the information about the frequency load of the base station may include information about the ratio of the frequency resources available in a certain time interval to all the frequency resources available to the base station. For example, the information about the frequency load of the base station may include information about the ratio of the frequency resources available in the base station for a certain time interval from the current time. The information about the ratio of the frequency resources available in the base station for a certain time interval may include at least one of the average value, the median value, the maximum value, or the minimum value of the ratio of the frequency resources available in the base station for a certain time interval to all the frequency resources or a plurality of values changing over time.

Also, according to an embodiment of the disclosure, the first load information may include information about the central processing unit (CPU) load of the base station. That is, the first load information may include at least one of information about the frequency load of the base station or information about the CPU load of the base station. The information about the CPU load of the base station may include information about the CPU usage rate or the CPU occupation rate of the base station. The CPU usage rate or the CPU occupation rate may be determined according to various methods. For example, the CPU usage rate may be determined as the ratio of the amount of data that is currently processed per second to the amount of data that may be processed per second by the CPU. However, a method of calculating the CPU usage rate or the CPU occupation rate is not limited to the above example and may be determined in various ways, and because the contents widely known in the field related to CPU load calculation may be applied, detailed descriptions thereof will be omitted for conciseness.

According to an embodiment of the disclosure, the first load information may be indicated by using a certain information bit field. A method by which at least one bit in a certain information bit field represents the first load information and the number of at least one bit may be determined in various ways. An example of a method by which the base station transmits the first load information by using an information bit will be described with reference to FIGS. 3A and 3B.

According to an embodiment of the disclosure, the base station may include the first load information about the load of the base station in a spare bit string of the MIB. The spare bit string may refer to at least one bit to which no information is allocated among the bits constituting certain information in the 3GPP LTE and 5G standards and may also be referred to as a 'reserved bit'. In the 3GPP LTE and 5G standards, the spare bit string may be configured for the MIB. The number of spare bit strings may be determined in various ways and may be modified according to the future update of the standards. The base station may efficiently use the frequency resources by transmitting the first load information by using the spare bit string of the MIB without using other bits than the previously transmitted bits. Alternatively, at least one bit field for transmitting the load information of the base station may be preconfigured in the MIB. Alternatively, the base station may add at least one bit field to the MIB and transmit the load information of the base station by using the added bit field.

In operation 230, the terminal according to an embodiment of the disclosure may determine whether to access the base station by using the first load information based on identifying that the first load information is included in the MIB.

According to an embodiment of the disclosure, the terminal may identify the degree of the load of the base station by using the first load information and determine whether to access the base station according to the degree of the load of the base station. The terminal may determine to access the base station when the load of the base station is less than or equal to a certain threshold value. The certain threshold value as a reference for the terminal to access the base station may be determined in various ways, may be preconfigured in the terminal, or may be configured by the terminal from the base station. For example, when the threshold value is 70% and the load of the base station indicated by the first load information is 77%, the terminal may determine that the load of the base station is high and thus determine not to access the base station. When the load of the base station indicated by the first load information is 63%, the terminal may determine that the load of the base station is low and thus determine to access the base station. Also, the corresponding threshold values may be respectively configured according to the types of load information. For example, the frequency load threshold value for the frequency load of the base station and the CPU load threshold value for the CPU load may be respectively configured. Each threshold value corresponding to the type of load information may be one value or may include a plurality of threshold values. When the load of the base station exceeds a threshold value according to the type of load information, the terminal may determine whether to access the base station based on the load of the base station. For example, when each load for each type of load information of the base station is less than or equal to each threshold value, the terminal may determine to access the base station. Alternatively, when the load of the base station according to any one piece of load information is less than or equal to a threshold value corresponding to the type of the load information, the terminal may determine to access the base station. Also, when at least one load for each type of load information of the base station exceeds a threshold value, the terminal may determine not to access the base station.

Also, when the first load information includes two or more load values, the terminal may determine whether to access the base station by using the two or more load values. For example, when the first load information includes both information about the frequency load of the base station and information about the CPU load of the base station, the terminal may determine whether to access the base station by using both the information. The terminal may determine to access the base station when the frequency load of the base station is less than or equal to the frequency load threshold value and the CPU load of the base station is less than or equal to the CPU load threshold value. The frequency load threshold value and the CPU load threshold value may be determined in various ways. An example of a method by which the terminal determines whether to access the base station by using the threshold value will be described with reference to FIGS. 3A and 3B.

According to an embodiment of the disclosure, the base station may include the load information about the load of the base station in the SIB instead of the MIB. Thus, the terminal may receive the SIB from the base station based on identifying that the first load information is not included in the MIB and identify the second load information included in the received SIB. The terminal may determine whether to access the base station by using the second load information. A method by which the terminal determines whether to access the base station by using the second load information obtained through the SIB will be described in detail with reference to FIG. 4. Also, the base station may include the load information about the load of the base station in the DCI. A method of obtaining information about the load of the base station through the DCI will be described in detail with reference to FIG. 5.

In operation 240, the terminal according to an embodiment of the disclosure may access the base station based on the determination result. The terminal may control access to the base station based on the determination result. That is, the terminal may or may not access the base station according to the determination result of operation 230.

According to an embodiment of the disclosure, the terminal may determine to access or not to access the base station by using the load information of the base station obtained in the RRC idle mode (RRC_INACTIVE). Also, according to an embodiment of the disclosure, the terminal may obtain the load information of the base station of the serving cell or the base station of the camp-on cell in the RRC connected mode (RRC_CONNETED) or the RRC inactive mode (RRC_INACTIVE) and determine whether to maintain or activate the connection with the base station by using the obtained load information.

Also, according to an embodiment of the disclosure, the terminal may determine whether to perform a handover to another base station by using load information of the other base station, in the state of having camped on the base station of the serving cell. That is, in the state of RRC-connected to the first base station of the serving cell or in the state of having camped on according to the RRC inactive mode, the terminal may receive the load information of the second base station from the second base station and determine whether to perform a handover to the second base station according to the received load information of the second base station.

Also, according to an embodiment of the disclosure, in the RRC connected mode (RRC_CONNETED) or the RRC inactive mode (RRC_INACTIVE), the terminal may obtain the load information of the first base station of the serving cell or the first base station of the camp-on cell, obtain the load information of the second base station from the second base station, and determine whether to perform a handover to the second base station by comparing the load information of the first base station and the load information of the second base station. A method by which the terminal determines whether to perform a handover by comparing the load information of the first base station and the load information of the second base station will be described in detail with reference to FIG. 8.

According to an embodiment of the disclosure, in operation 230, the terminal may determine whether to access the base station by using the first load information of the base station and may automatically access the base station according to the determination result. Alternatively, the terminal may access the base station by providing the user with the first load information about the load of the base station and receiving a selection about whether to access the base station from the user. For example, the terminal may display a user interface representing the first load information of the base station and may receive a selection about whether to access the base station from the user. The user interface displayed by the terminal will be described with reference to FIGS. 9 and 10.

The terminal according to an embodiment of the disclosure may perform a handover to the base station with a low frequency load and/or a low CPU load by obtaining information about the frequency load of the base station or information about the CPU load of the base station from the base station through at least one piece of information among the MIB, the SIB, or the DCI or an information block. By performing a handover to the base station with a low frequency load and/or a low CPU load, the terminal may improve the power efficiency of the terminal, reduce the communication delay, secure a high data rate, and improve the resource use efficiency of the network.

In FIG. 2, for convenience of description, it has been described that the first load information is obtained from one base station through the MIB. However, the terminal may obtain load information of each base station from a plurality of base stations through the MIB by using the method described with reference to FIG. 2. Also, the terminal may compare load information of a plurality of base stations and access the base station with the lowest load. Also, the terminal may access the selected base station by providing load information of a plurality of base stations to the user and receiving a selection for accessing any one base station from the user.

FIGS. 3A and 3B are diagrams for describing a method of identifying load information of a base station through an information bit, according to an embodiment of the disclosure.

According to an embodiment of the disclosure, information about the load of the base station may be indicated by using a certain information bit field. For example, the degree of the load of the base station may be divided into a plurality of levels. The certain information bit field may indicate one of a plurality of levels representing the degree of the load of the base station. The information about the load of the base station may be indicated by using one or more bits. The base station may transmit the information about the load of the base station to the terminal by using one or more information bits included in at least one of the MIB, the SIB, or the DCI. Hereinafter, for convenience of description, the MIB will be described as an example.

Referring to FIG. 3A, the degree of the load of the base station may be indicated by using one bit. For example, that one information bit indicating the load of the base station in the MIB is '0' may indicate that a frequency load $L_f$ of the base station is less than or equal to a frequency load threshold value $p_{f1}$ (e.g., 85%) and/or that a CPU load $L_c$ of the base station is less than or equal to a CPU load threshold value $p_{c1}$ (e.g., 90%). Also, when the frequency load $L_f$ of the base station exceeds the frequency load threshold value $p_{f1}$ or the CPU load $L_c$ of the base station exceeds the CPU load threshold value $p_{c1}$, the load of the base station may be indicated by an information bit '1'.

Also, the degree of the load of the base station may be indicated by using a plurality of bits. Referring to FIG. 3B, the degree of the load of the base station may be indicated by using two bits. For example, the degree of the load of the base station may be divided into four levels according to frequency load threshold values $p_{f1}$, $p_{f2}$, and $p_{f3}$ and a CPU load threshold value $p_{c1}$. Each of the combinations of two bits ('00', '01', '10', and '11') may correspond to any one of the four levels. For example, that one information bit indicating the load of the base station in the MIB is '01' may indicate that a frequency load $L_f$ of the base station exceeds a frequency load threshold value $p_{f1}$ (e.g., 25%) and is less than or equal to $p_{f2}$ (e.g., 50%) and/or that a CPU load $L_c$ of the base station is less than or equal to a CPU load threshold value $p_{c1}$ (e.g., 90%).

The terminal may identify the information bit field indicating the load of the base station in the MIB and may identify the load information of the base station corresponding to the identified bit value. Information about the correspondence between the bit value of the information bit field and the load information of the base station may be preconfigured in the terminal or may be configured by the terminal from the base station.

The correspondence between the bit values of the information bit field and the load information of the base station described with reference to FIGS. 3A and 3B is merely an example. The number of bits indicating the information about the load of the base station is not limited to the above example and may be determined in various ways. Also, the correspondence between the bit values and the load information of the base station is not limited to the above example and may be determined in various ways. Hereinafter, a method by which the terminal identifies the load information of the base station by using the MIB and the SIB according to an embodiment of the disclosure will be described with reference to FIG. 4.

Figure 4:
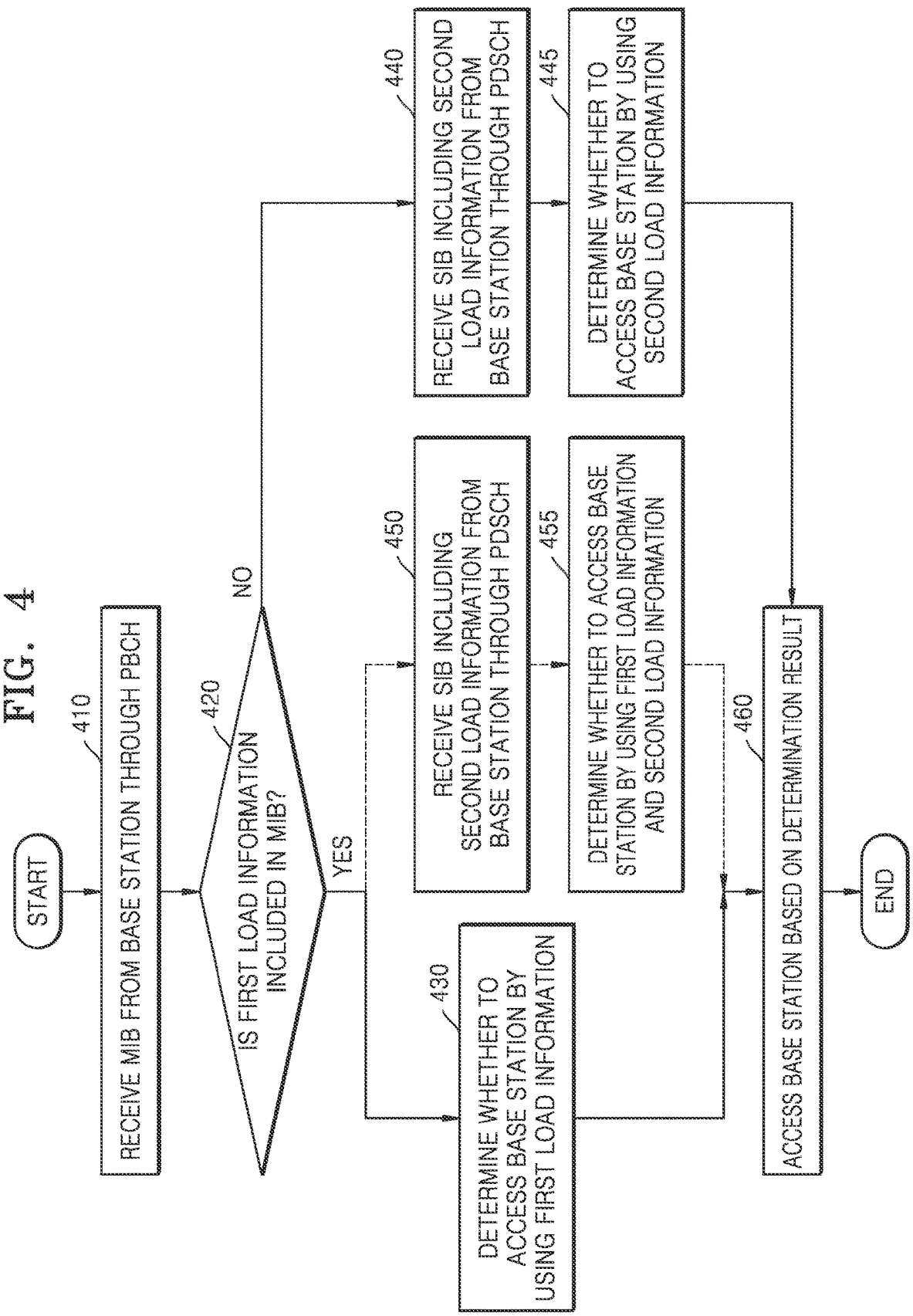
FIG. 4 is a flowchart for describing a method by which a terminal determines whether to access a base station by using an MIB or an SIB, according to an embodiment of the disclosure.

FIG. 4 is a flowchart for describing a method by which a terminal determines whether to access a base station by using an MIB or an SIB, according to an embodiment of the disclosure.

Referring to FIG. 4, in operation 410, the terminal according to an embodiment of the disclosure may receive the MIB from the base station through the PBCH. In operation 420, the terminal may identify whether the first load information is included in the MIB. In operation 430, the terminal may determine whether to access the base station by using the first load information based on identifying that the first load information is included in the MIB.

In operation 440, the terminal according to an embodiment of the disclosure may receive the SIB including the second load information from the base station through the PDSCH based on identifying that the first load information is not included in the MIB. The base station may include the load information about the load of the base station in the SIB instead of the MIB. The SIB may be, for example, SIB1, and may be another SIB other than SIB1. By decoding the received MIB, the terminal may obtain a search space for monitoring a physical downlink control channel (PDCCH), configuration information about CORESET and SIB1, or the like. The terminal may receive the DCI through the PDCCH and receive the SIB through the PDSCH by using DCI. A method by which the base station includes the first load information in the MIB may be analogously applied to a method by which the base station includes the second load information in the SIB.

In operation 445, the terminal according to an embodiment of the disclosure may determine whether to access the base station by using the second load information. A method by which the terminal determines whether to access the base station by using the first load information may be analogously applied to a method by which the terminal determines whether to access the base station by using the second load information.

In operation 450, the terminal according to an embodiment of the disclosure may receive the SIB including the second load information from the base station through the PDSCH even when the first load information is included in the MIB. That is, the base station may include the load information about the load of the base station in both the MIB and the SIB.

In operation 455, the terminal according to an embodiment of the disclosure may determine whether to access the base station by using the first load information and the second load information.

According to an embodiment of the disclosure, the first load information included in the MIB and the second load information included in the SIB may indicate different values with respect to the load of the base station. For example, the first load information may include information about the load of the base station at or before the time when the base station transmits the MIB, and the second load information may include information about the load of the base station at or before the time when the base station transmits the SIB after transmitting the MIB. That is, the first load information and the second load information may include information about the load of the base station at different times. Also, each of the first load information and the second load information may include information about the time when the load of the base station is calculated.

According to an embodiment of the disclosure, the terminal may determine whether to access the base station by using information about the load of the base station at the later (i.e., most recent) time among the first load information and the second load information. Alternatively, the terminal may determine to access the base station when both the degree of the load of the base station indicated by the first load information and the degree of the load of the base station indicated by the second load information are less than or equal to a certain threshold value. However, a method by which the terminal determines to access the base station by using the first load information and the second load information is not limited to the above example and may be determined in various ways.

In operation 460, the terminal according to an embodiment of the disclosure may access the base station based on the determination result. The terminal may control access to the base station based on the determination result.

Because operations 410, 420, 430, and 460 of FIG. 4 respectively correspond to operations 210, 220, 230, and 240 of FIG. 2, the description of FIG. 2 may be analogously applied to the detailed content of each operation. Hereinafter, a method by which the terminal identifies the load information of the base station by using the DCI according to an embodiment of the disclosure will be described with reference to FIG. 5.

Figure 5:
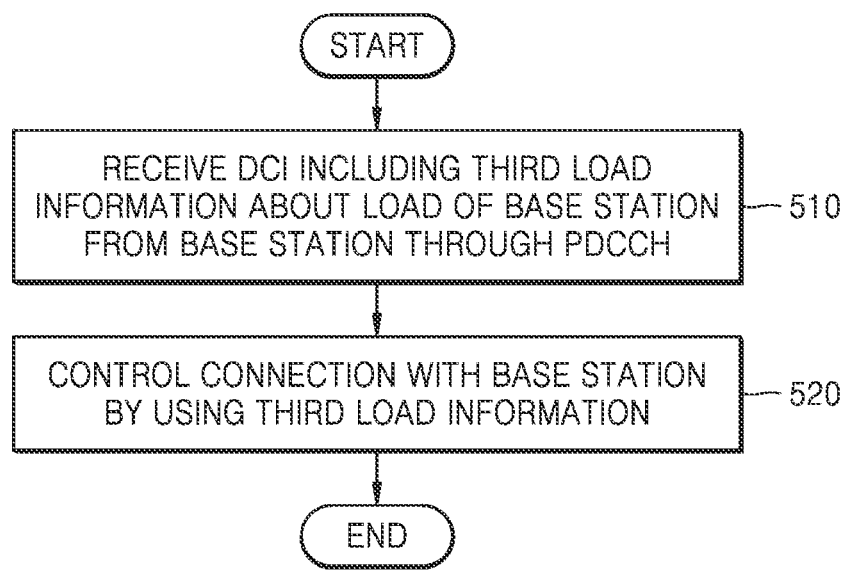
FIG. 5 is a flowchart for describing a method by which a terminal determines whether to access a base station by using downlink control information (DCI), according to an embodiment of the disclosure.

FIG. 5 is a flowchart for describing a method by which a terminal determines whether to access a base station by using downlink control information (DCI), according to an embodiment of the disclosure.

Referring to FIG. 5, in operation 510, the terminal according to an embodiment of the disclosure may receive the DCI including the third load information about the load of the base station from the base station through the PDCCH. The base station may include the information about the load of the base station in the DCI. A method by which the base station includes the first load information in the MIB may be analogously applied to a method by which the base station includes the third load information about the load of the base station in the DCI.

According to an embodiment of the disclosure, the terminal may receive the DCI from the base station through the PDCCH in the RRC connected mode (RRC_CONNECTED), the RRC inactive mode (RRC_INACTIVE), or the RRC idle mode (RRC_IDLE) with respect to the base station. That is, the terminal may establish an RRC connection with the base station and receive the DCI including the third load information from the base station in order to determine whether to maintain the connection with the base station in the RRC connected mode (RRC_CONNECTED). Alternatively, after switching to the RRC inactive mode (RRC_INACTIVE) or the RRC idle mode (RRC_IDLE), in order to resume or re-establish the RRC connection to the base station or to determine whether to access another base station (e.g., whether to perform cell reselection), the terminal may receive the DCI including the third load information from the base station in the RRC inactive mode (RRC_INACTIVE) or the RRC idle mode (RRC_IDLE).

In operation 520, the terminal according to an embodiment of the disclosure may control the connection with the base station based on the third load information. The terminal may determine whether to access the base station by using the third load information. The base station may include only the DCI in the MIB and the SIB without including the information about the load of the base station therein. A method by which the terminal determines whether to access the base station by using the first load information may be analogously applied to a method by which the terminal determines whether to access the base station by using the third load information. Alternatively, before receiving the DCI including the third load information, the terminal may obtain the first load information by receiving the MIB or obtain the second load information by receiving the SIB. The terminal may determine whether to access the base station by further using at least one of the first load information or the second load information together with the third load information. A method by which the terminal determines whether to access the base station by using the first load information and the second load information may be analogously applied to a method by which the terminal determines whether to access the base station by using the third load information together with at least one of the first load information or the second load information. For example, the terminal may determine whether to access the base station by using information about the load of the base station at the later (i.e., most recent) time among the first load information, the second load information, and the third load information.

In FIGS. 2 to 5, an operation of the terminal for determining whether to access the base station according to an embodiment of the disclosure has been mainly described above. Hereinafter, a method by which the base station broadcasts the MIB or the SIB including the load information according to an embodiment of the disclosure will be described with reference to FIG. 6.

Figure 6:
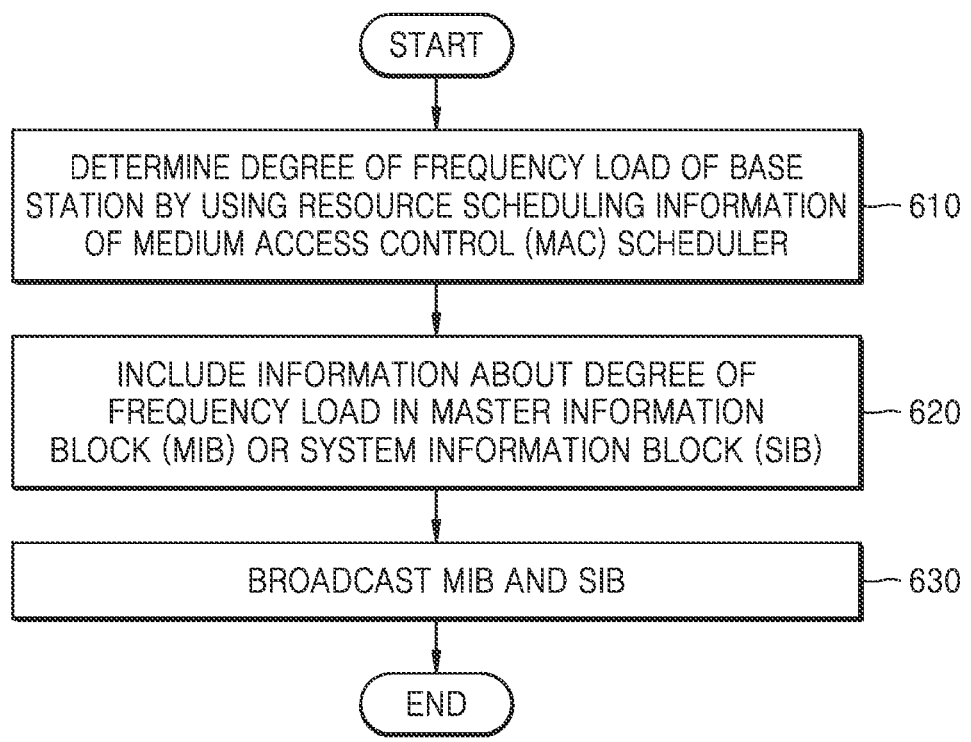
FIG. 6 is a flowchart for describing a method by which a base station broadcasts an MIB or SIB including load information, according to an embodiment of the disclosure.

FIG. 6 is a flowchart for describing a method by which a base station broadcasts an MIB or SIB including load information, according to an embodiment of the disclosure.

Referring to FIG. 6, in operation 610, the base station according to an embodiment of the disclosure may determine the degree of the frequency load of the base station by using resource scheduling information of a medium access control (MAC) scheduler. As a frequency resource available in the base station, the base station may determine a frequency resource not scheduled in the MAC scheduler at a certain time or for a certain time interval or an unoccupied frequency resource. The base station may calculate the ratio of the frequency resources available at a certain time or for a certain time interval to all the frequency resources available to the base station and determine the same as the degree of the frequency load of the base station.

In operation 620, the base station according to an embodiment of the disclosure may include information about the degree of the frequency load in the MIB or the SIB.

According to an embodiment of the disclosure, the base station may include the information about the frequency load of the base station in the MIB or the SIB by using a certain information bit field. Also, the base station may determine in which of the MIB and the SIB the information about the degree of the frequency load of the base station is to be included, based on the amount of the information bit field available in the MIB and the SIB. For example, the base station may include the information about the degree of the frequency load of the base station in the block having the larger spare bit string among the MIB and the SIB. However, the above is merely an example, and the base station may determine in which block the information about the degree of the frequency load of the base station is to be included, according to various criteria. Also, the base station may include the information about the degree of the frequency load in the DCI. That is, the base station may include the information about the degree of the frequency load of the base station in at least one (information or information block) of the MIB, the SIB, or the DCI.

In operation 630, the base station according to an embodiment of the disclosure may broadcast the MIB and the SIB. The base station may broadcast the MIB or the SIB including the information about the degree of the frequency load of the base station such that a certain terminal receiving the system information from the base station may obtain information about the load of the base station. Also, the base station may transmit the DCI including the information about the degree of the frequency load of the base station to the terminal through the PDCCH. Also, the base station may transmit information about the frequency load of the base station or information about the CPU load of the base station to the terminal through at least one (information or information block) of the MIB, the SIB, or the DCI to provide the terminal with the load information of the base station that may be used by the terminal to perform a handover to the base station with a low frequency load and/or a low CPU load. By performing a handover to the base station with a low frequency load and/or a low CPU load, the terminal having received the load information from the base station may improve the power efficiency of the terminal, reduce the communication delay, secure a high data rate, and improve the resource use efficiency of the network.

In FIG. 6, for convenience of description, a method by which the base station transmits the information about the frequency load has been described; however, the description of the method of transmitting the frequency load may also be analogously applied to a method by which the base station transmits the information about the CPU load. For example, the base station may obtain the information about the CPU load of the base station through a system/platform software application programming interface (API) and transmit the information about the CPU load of the base station by using at least one (information or information block) of the MIB, the SIB, or the DCI. Also, the base station may transmit the information about the frequency load of the base station and the information about the CPU load of the base station together as the information about the load of the base station.

Figure 7:
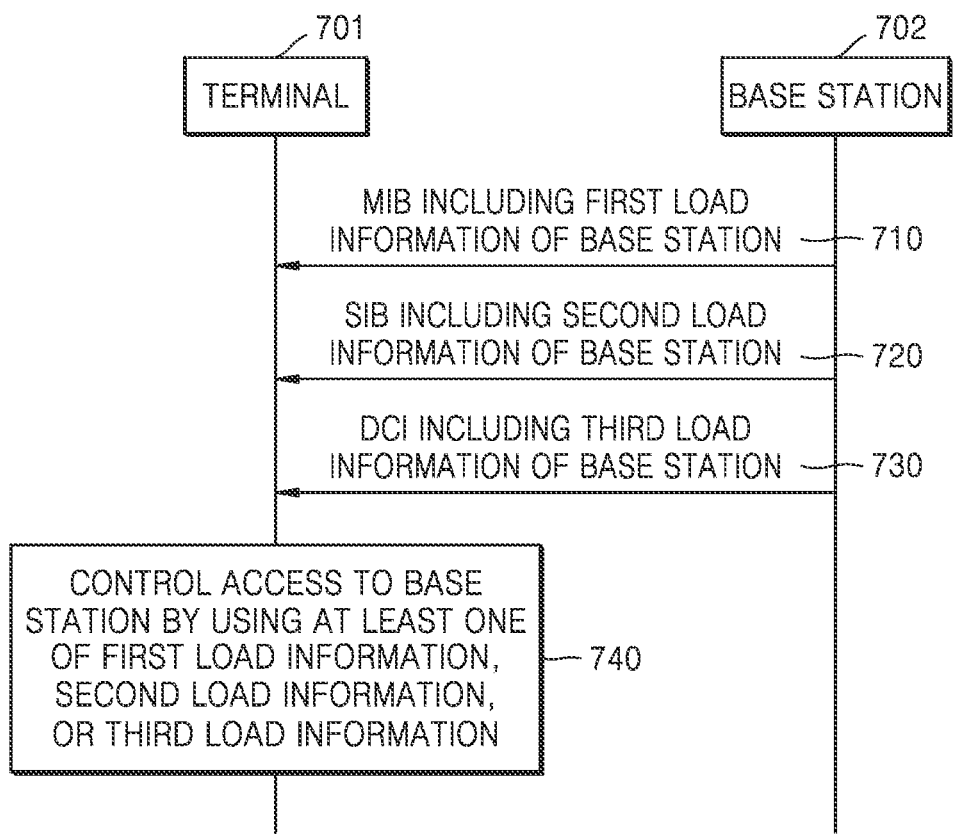
FIG. 7 is a transmission/reception diagram for describing a method by which a terminal receives load information of a base station from the base station, according to an embodiment of the disclosure.

FIG. 7 is a transmission/reception diagram for describing a method by which a terminal receives load information of a base station from the base station, according to an embodiment of the disclosure.

Referring to FIG. 7, a base station 702 may transmit, to a terminal 701, at least one (information or information block) of an MIB 710 including first load information about the load of the base station 702, an SIB 720 including second load information about the load of the base station 702, or DCI 730 including third load information about the load of the base station 702. In operation 740, the terminal 701 may control access to the base station by using at least one of the first load information, the second load information, or the third load information.

The terminal 701 according to an embodiment of the disclosure may receive the first load information, the second load information, or the third load information from the base station through the MIB 710, the SIB 720, or the DCI 730 respectively to obtain information about the load of the base station 702 near the time when the terminal 701 determines whether to access the base station 702. Hereinafter, a method by which the terminal performs a handover based on the load information of the base station according to an embodiment of the disclosure will be described with reference to FIG. 8.

Figure 8:
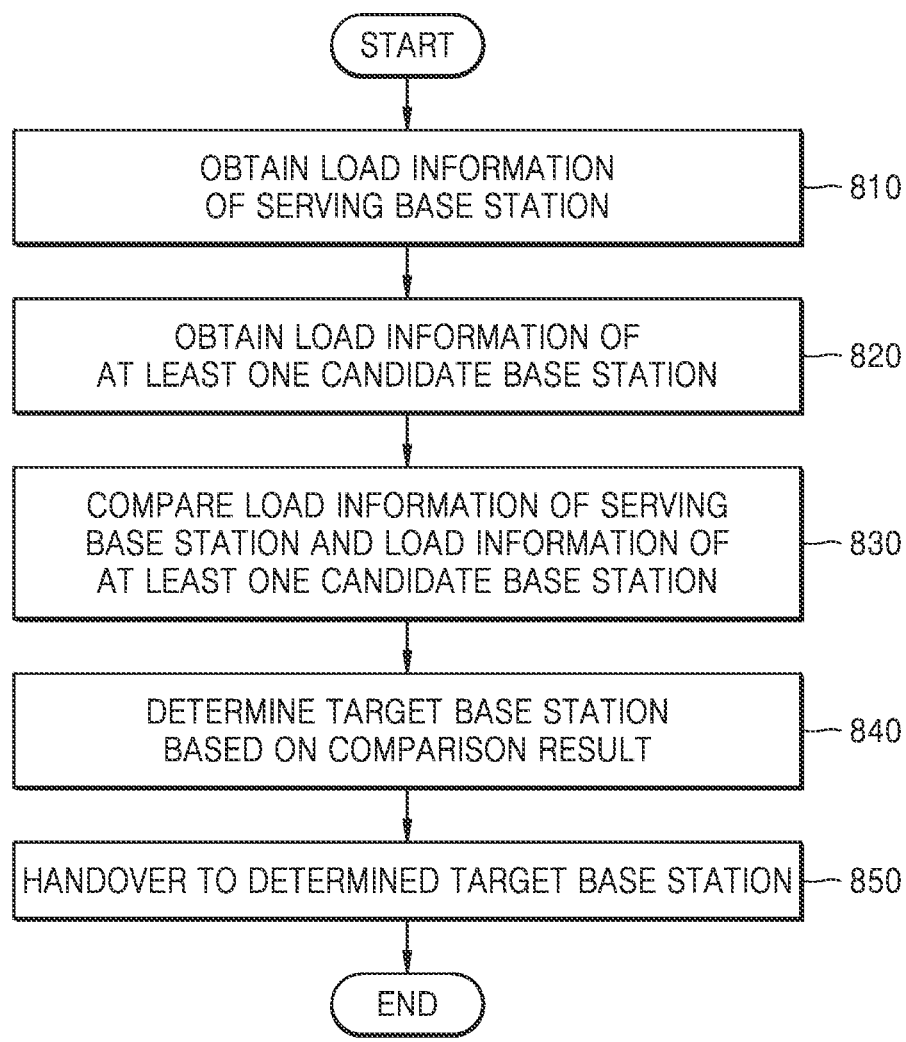
FIG. 8 is a flowchart for describing a method by which a terminal performs a handover based on load information of a serving base station and a candidate base station, according to an embodiment of the disclosure.

FIG. 8 is a flowchart for describing a method by which a terminal performs a handover based on load information of a serving base station and a candidate base station, according to an embodiment of the disclosure.

Referring to FIG. 8, in operation 810, the terminal according to an embodiment of the disclosure may obtain load information of a serving base station. The method by which the terminal obtains the load information of the base station described with reference to FIGS. 2 to 7 may be applied to a method by which the terminal obtains the load information of the serving base station.

In operation 820, the terminal according to an embodiment of the disclosure may obtain load information of at least one candidate base station. The terminal may identify at least one candidate base station around the terminal in order to communicate with a base station through which communication is smoothest (e.g., a base station having the best data rate or a base station having the smallest communication delay). The terminal may obtain load information of at least one identified candidate base station. The method by which the terminal obtains the load information of the base station described with reference to FIGS. 2 to 7 may be applied to a method by which the terminal obtains load information of at least one candidate base station.

In operation 830, the terminal according to an embodiment of the disclosure may compare the load information of the serving base station and the load information of at least one candidate base station. In operation 840, the terminal may determine a target base station based on the comparison result. For example, the terminal may determine a base station identified as having the smallest load among the serving base station and at least one candidate base station as a target base station and may proceed to operation 850. Also, when the load of the serving base station is smallest, the terminal may determine not to perform a handover and may not proceed to operation 850. In operation 850, the terminal may perform a handover procedure to the determined target base station.

Figure 9:
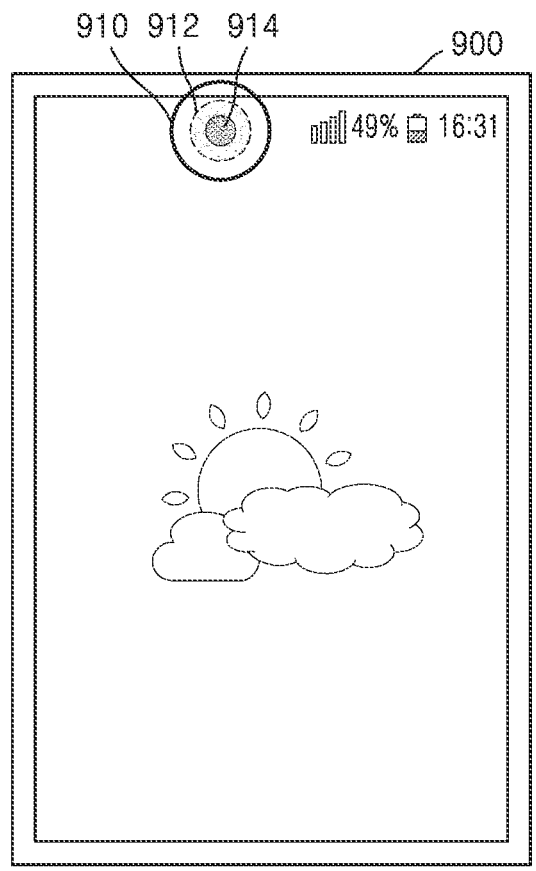
FIG. 9 is a diagram for describing a method by which a terminal displays load information of a base station, according to an embodiment of the disclosure.

FIG. 9 is a diagram for describing a method by which a terminal displays load information of a base station, according to an embodiment of the disclosure.

Referring to FIG. 9, the terminal according to an embodiment of the disclosure may display a graphic user interface (GUI) 910 representing the load information of the base station on a display 900 of the terminal. The GUI may visually display the degree of the load of the base station. For example, the GUI may be displayed in the form of two circles, an outer circle 912 may indicate the amount of all frequency resources available in the base station, and the size of an inner circle 914 highlighted or colored in the outer circle 912 may represent the amount of frequency resources currently available in the base station. The terminal may adjust the size of the inner circle 914 displayed on the display 900 by using the load information of the base station received from the base station. The base station on which the load information is displayed through the GUI 910 may be a serving base station of the terminal or may be a base station other than the serving base station.

However, FIG. 9 is merely an example, and a method by which the terminal displays the load information of the base station is not limited to that illustrated in FIG. 9 and may be determined in various ways. For example, the load information of the base station may be displayed as a GUI in a form other than a circle, and load information of a plurality of base stations may be displayed through a plurality of GUIs.

Figure 10:
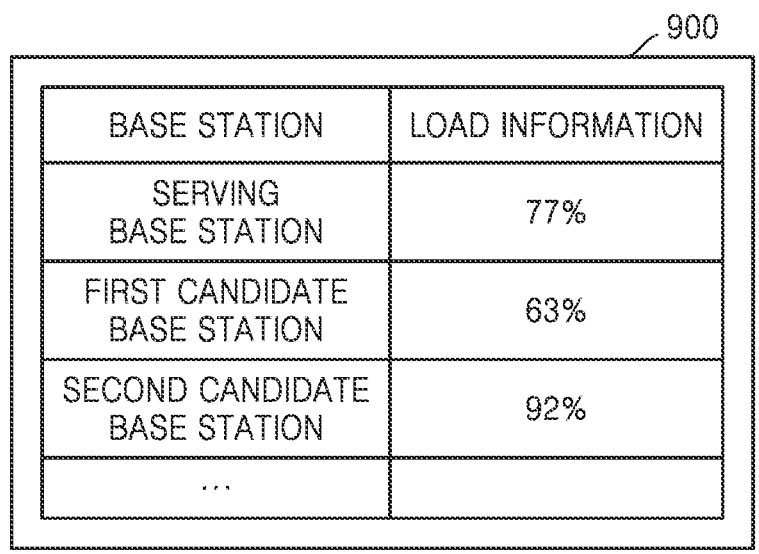
FIG. 10 is a diagram for describing a method by which a terminal displays load information of a plurality of base stations, according to an embodiment of the disclosure.

FIG. 10 is a diagram for describing a method by which a terminal displays load information of a plurality of base stations, according to an embodiment of the disclosure.

Referring to FIG. 10, the terminal may display load information of each of a serving base station and at least one candidate base station through a user interface of a display 900. The user may select any one base station among the displayed base stations with reference to the load information. The terminal may perform a handover procedure to the base station selected by the user.

Figure 11:
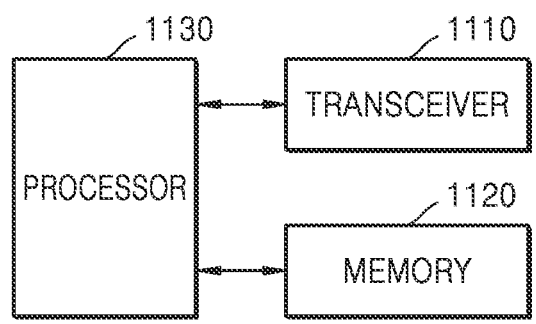
FIG. 11 is a block diagram of a terminal according to an embodiment of the disclosure.

FIG. 11 is a block diagram of a terminal according to an embodiment of the disclosure.

Referring to FIG. 11, the terminal may include a transceiver 1110, a memory 1120, and a processor 1130. The transceiver 1110, the processor 1130, and the memory 1120 of the terminal may operate according to the above communication method of the terminal. However, the components of the terminal are not limited thereto. For example, the terminal may include more components or fewer components than the above components. In addition, the transceiver 1110, the processor 1130, and the memory 1120 may be implemented as a single chip. Also, the processor 1130 may include one or more processors.

The transceiver 1110 may collectively refer to a receiver and a transmitter of the terminal and may exchange signals with a network entity, a base station, or another terminal. Also, the signals exchanged with the network entity, the base station, or the other terminal may include control information and data. For this purpose, the transceiver 1110 may include, for example, an RF transmitter for up-converting and amplifying a transmitted signal and an RF receiver for low-noise-amplifying and down-converting a received signal. However, this is merely an embodiment of the transceiver 1110, and the components of the transceiver 1110 are not limited to the RF transmitter and the RF receiver.

Also, the transceiver 1110 may receive a signal on a radio channel and output the signal to the processor 1130 and may transmit a signal output from the processor 1130, on a radio channel.

The memory 1120 may store programs and data necessary for the operation of the terminal. Also, the memory 1120 may store control information or data included in the signals obtained by the terminal. The memory 1120 may include a storage medium or a combination of storage media such as ROM, RAM, hard disk, CD-ROM, and DVD. Also, the memory 1120 may not exist separately and may be included in the processor 1130.

The processor 1130 may control a series of processes such that the terminal may operate according to the above embodiments of the disclosure. For example, the processor 1130 may receive a control signal and a data signal through the transceiver 1110 and process the received control signal and data signal. Also, the processor 1130 may transmit the processed control signal and data signal through the transceiver 1110. Also, the processor 1130 may control the components of the terminal to receive the DCI including two layers to receive a plurality of PDSCHs simultaneously.

According to an embodiment of the disclosure, the processor 1130 may receive a master information block (MIB) from the base station through a physical broadcast channel (PBCH) by controlling the transceiver, determine whether first load information about the load of the base station is included in the MIB, determine whether to access the base station by using the first load information based on the determination result, and access the base station based on the determination result.

According to an embodiment of the disclosure, the first load information may include at least one of information about the frequency load of the base station or information about the central processing unit (CPU) load of the base station.

According to an embodiment of the disclosure, the first load information may be broadcast by using a certain information bit field in the MIB.

According to an embodiment of the disclosure, the certain information bit field may include at least one reserved bit or a spare bit string in the MIB.

According to an embodiment of the disclosure, the degree of the load of the base station may be divided into a plurality of levels, the certain information bit field may include information indicating one of the plurality of levels, and the processor 1130 may determine to access the base station when the degree of the load of the base station is less than or equal to a certain threshold value.

According to an embodiment of the disclosure, the processor 1130 may receive a system information block (SIB) including second load information about the load of the base station from the base station through a physical downlink shared channel (PDSCH) by controlling the transceiver and determine whether to access the base station by using at least one of the first load information or the second load information.

According to an embodiment of the disclosure, the processor 1130 may receive downlink control information (DCI) including third load information about the load of the base station from the base station through a physical downlink control channel (PDCCH) by controlling the transceiver and control the connection with the base station by using the third load information.

Figure 12:
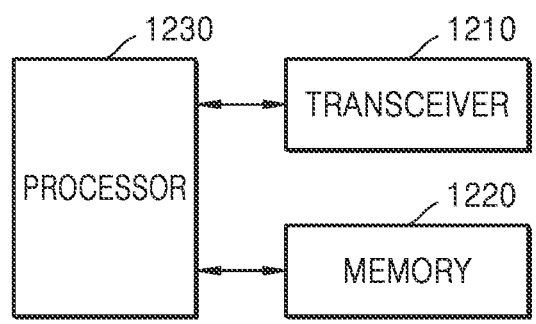
FIG. 12 is a block diagram of a base station according to an embodiment of the disclosure.

FIG. 12 is a block diagram of a base station according to an embodiment of the disclosure.

Referring to FIG. 12, the base station may include a transceiver 1210, a memory 1220, and a processor 1230. The transceiver 1210, the processor 1230, and the memory 1220 of the base station may operate according to the above communication method of the base station. However, the components of the base station are not limited thereto. For example, the base station may include more components or fewer components than the above components. In addition, the transceiver 1210, the processor 1230, and the memory 1220 may be implemented as a single chip. Also, the processor 1230 may include one or more processors.

The transceiver 1210 may collectively refer to a receiver and a transmitter of the base station and may exchange signals with a terminal or a network entity. The signals exchanged with the terminal or the network entity may include control information and data. For this purpose, the transceiver 1210 may include, for example, an RF transmitter for up-converting and amplifying a transmitted signal and an RF receiver for low-noise-amplifying and down-converting a received signal. However, this is merely an embodiment of the transceiver 1210, and the components of the transceiver 1210 are not limited to the RF transmitter and the RF receiver.

Also, the transceiver 1210 may receive a signal on a radio channel and output the signal to the processor 1230 and may transmit a signal output from the processor 1230, on a radio channel.

The memory 1220 may store programs and data necessary for the operation of the base station. Also, the memory 1220 may store control information or data included in the signals obtained by the base station. The memory 1220 may include a storage medium or a combination of storage media such as ROM, RAM, hard disk, CD-ROM, and DVD. Also, the memory 1220 may not exist separately and may be included in the processor 1230.

The processor 1230 may control a series of processes such that the base station may operate according to the above embodiments of the disclosure. For example, the processor 1230 may receive a control signal and a data signal through the transceiver 1210 and process the received control signal and data signal. Also, the processor 1230 may transmit the processed control signal and data signal through the transceiver 1210. Also, the processor 1230 may control each component of the base station to configure and transmit DCI including allocation information about the PDSCH.

According to an embodiment of the disclosure, the processor 1230 may determine the degree of the frequency load of the base station by using resource scheduling information of a medium access control (MAC) scheduler, include information about the degree of the frequency load in a master information block (MIB) or a system information block (SIB), and broadcast the MIB and the SIB by controlling the transceiver. The information about the degree of the frequency load may include information about one of a plurality of intervals representing the degree of the frequency load.

According to an embodiment of the disclosure, the processor 1230 may include the information about the degree of the frequency load in the MIB by using a certain information bit field in the MIB.

According to an embodiment of the disclosure, the certain information bit field may include at least one reserved bit or a spare bit string in the MIB.

According to an embodiment of the disclosure, the processor 1230 may determine the central processing unit (CPU) load of the base station and include information about the CPU load in the MIB or the SIB.

According to an embodiment of the disclosure, the processor 1230 may include the information about the degree of the frequency load in downlink control information (DCI) and transmit the DCI to the terminal through a physical downlink control channel (PDCCH).

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored a memory including any combination of some or all thereof. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured as any combination thereof. Such a storage device may be connected through an external port to an apparatus performing embodiments of the disclosure. Also, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

It should be understood that the embodiments of the disclosure described herein should be considered in a descriptive sense only and not for purposes of limitation. That is, it will be understood by those of ordinary skill in the art that various changes in form and details may be made in the embodiments of the disclosure without departing from the scope of the disclosure. Also, the embodiments of the disclosure may be operated in combination when necessary. For example, the base station and the terminal may be operated according to a combination of portions of an embodiment and another embodiment of the disclosure. Also, the embodiments of the disclosure may also be applied to other communication systems, and other modifications based on the technical spirit of the embodiments of the disclosure may also be implemented.

The invention claimed is:

1. A method, performed by a terminal, of controlling access to a base station in a wireless communication system, the method comprising:
   receiving a master information block (MIB) including first load information from a base station through a physical broadcast channel (PBCH),
   wherein the first load information includes information about a frequency load of the base station including a ratio of frequency resources available at a time when the base station broadcasts the MIB to all the frequency resources available to the base station;
   identifying a degree of a load of the base station based on the first load information;
   determining whether to access the base station based on the degree of the load of the base station; and
   accessing the base station based on a result of the determining,
   wherein the frequency resources available at the time include a frequency resource not scheduled by the base station at the time and an unoccupied frequency resource at the time.

2. The method of claim 1, wherein the first load information further includes information about a central processing unit (CPU) load of the base station.

3. The method of claim 1, wherein the first load information is broadcast by using a certain information bit field in the MIB.

4. The method of claim 3, wherein the certain information bit field includes at least one reserved bit or a spare bit string in the MIB.

5. The method of claim 3, wherein the degree of the load of the base station is divided into a plurality of levels and the certain information bit field includes information indicating one of the plurality of levels, and
the determining of whether to access the base station comprises determining to access the base station when the degree of the load of the base station is less than or equal to a certain threshold value.

6. The method of claim 1, further comprising:
receiving a system information block (SIB) including second load information from the base station through a physical downlink shared channel (PDSCH); and
identifying the degree of a load of the base station based on at least one of the first load information or the second load information.

7. The method of claim 1, further comprising:
receiving downlink control information (DCI) including third load information from the base station through a physical downlink control channel (PDCCH); and
controlling a connection with the base station based on the third load information.

8. A method, performed by a base station in a wireless communication system, the method comprising:
determining load information by using resource scheduling information of a medium access control (MAC) scheduler, wherein the load information includes information about a frequency load of the base station including a ratio of frequency resources available at a time when the base station determines the frequency load to all the frequency resources available to the base station;
including the load information in at least one of a master information block (MIB) or a system information block (SIB); and
broadcasting the MIB and the SIB,
wherein the frequency resources available at the time include a frequency resource not scheduled by the base station at the time and an unoccupied frequency resource at the time.

9. The method of claim 8, wherein the including of the load information in the MIB comprises including the load information in the MIB by using a certain information bit field in the MIB.

10. The method of claim 8, further comprising:
determining a central processing unit (CPU) load of the base station; and
including information about the CPU load in at least one of the MIB or the SIB.

11. The method of claim 8, further comprising:
including the load information in downlink control information (DCI); and
transmitting the DCI to a terminal through a physical downlink control channel (PDCCH).

12. A terminal for controlling access to a base station in a wireless communication system, the terminal comprising:
a transceiver; and
at least one processor configured to:
receive a master information block (MIB) including first load information from a base station through a physical broadcast channel (PBCH) by controlling the transceiver,
wherein the first load information includes information about a frequency load of the base station including a ratio of frequency resources available at a time when the base station broadcasts the MIB to all the frequency resources available to the base station,
identify a degree of a load of the base station based on the first load information,
determine whether to access the base station based on the degree of the load of the base station, and
access the base station based on a result of the determining,
wherein the frequency resources available at the time include a frequency resource not scheduled by the base station at the time and an unoccupied frequency resource at the time.

13. The terminal of claim 12, wherein the first load information further includes information about a central processing unit (CPU) load of the base station.

14. The terminal of claim 12, wherein the first load information is broadcast by using a certain information bit field in the MIB.

15. A base station in a wireless communication system, the base station comprising:
a transceiver; and
at least one processor configured to:
determine load information by using resource scheduling information of a medium access control (MAC) scheduler, wherein the load information includes information about a frequency load of the base station including a ratio of frequency resources available at a time when the base station determines the frequency load to all the frequency resources available to the base station,
include the load information in at least one of a master information block (MIB) or a system information block (SIB), and
broadcast the MIB and the SIB by controlling the transceiver,
wherein the frequency resources available at the time include a frequency resource not scheduled by the base station at the time and an unoccupied frequency resource at the time.

* * * * *